April 28, 1953   F. S. TUTTON   2,636,445
PRODUCTION METHOD AND APPARATUS
Filed Dec. 27, 1946   13 Sheets-Sheet 1

Fred S. Tutton
INVENTOR
BY Lester B. Clark
& Ray L. Smith
ATTORNEYS

April 28, 1953 — F. S. TUTTON — 2,636,445
PRODUCTION METHOD AND APPARATUS
Filed Dec. 27, 1946 — 13 Sheets-Sheet 2

Fred S. Tutton
INVENTOR
BY Lester B. Clark
Ray L. Smith
ATTORNEYS

April 28, 1953
F. S. TUTTON
2,636,445
PRODUCTION METHOD AND APPARATUS
Filed Dec. 27, 1946
13 Sheets-Sheet 3
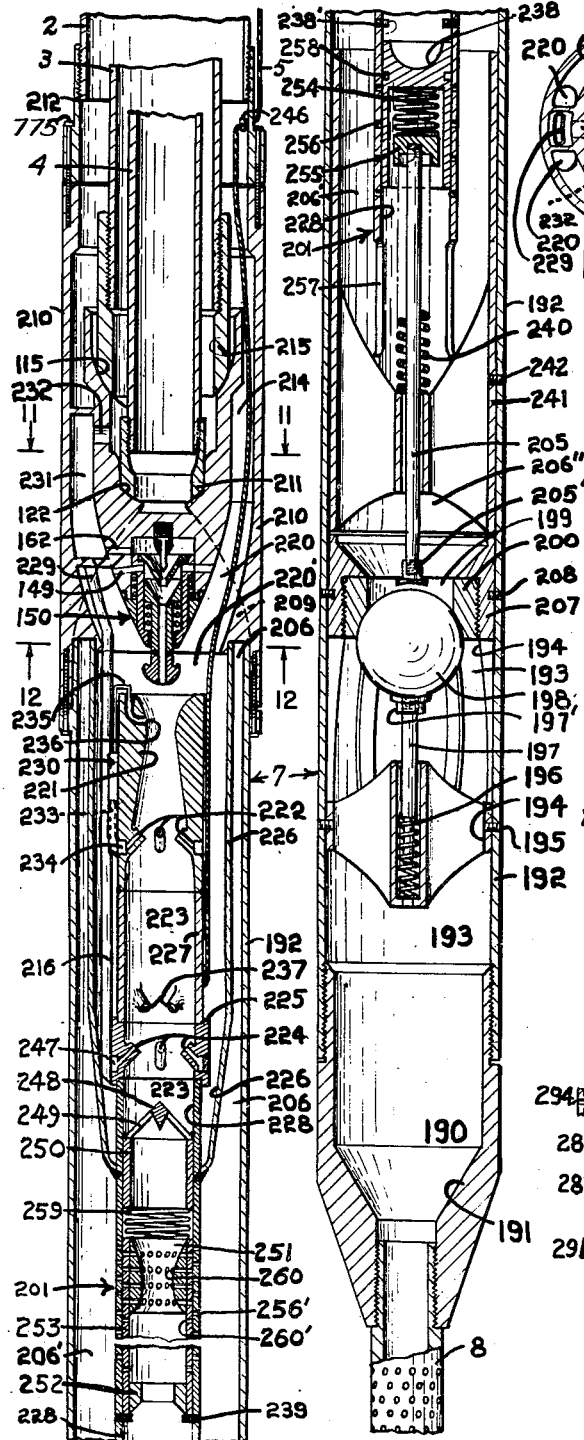
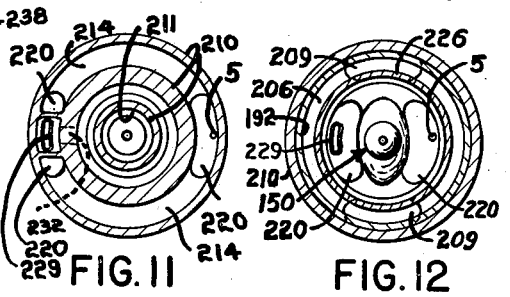
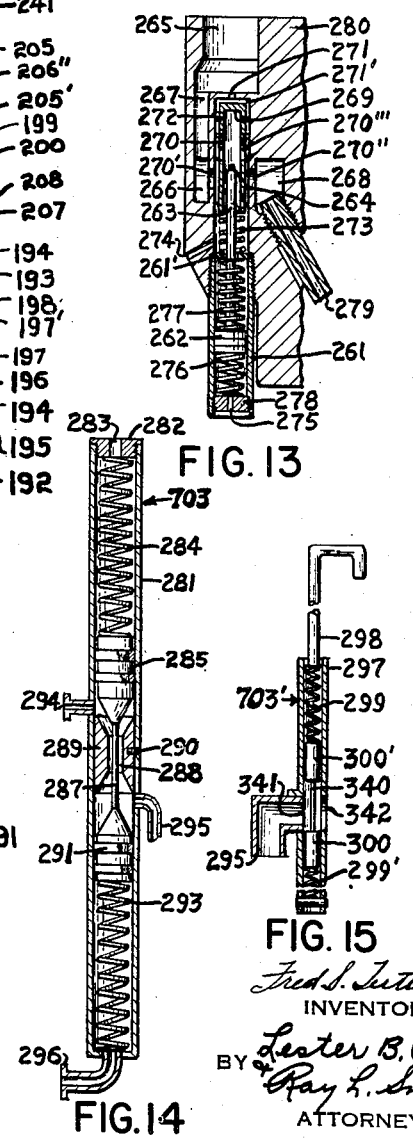
Fred S. Tutton
INVENTOR
BY Lester B. Clark
Ray L. Smith
ATTORNEYS April 28, 1953  F. S. TUTTON  2,636,445
PRODUCTION METHOD AND APPARATUS
Filed Dec. 27, 1946  13 Sheets-Sheet 4

Fred S. Tutton
INVENTOR.
BY Lester B. Clark
& Ray L. Smith
ATTORNEYS

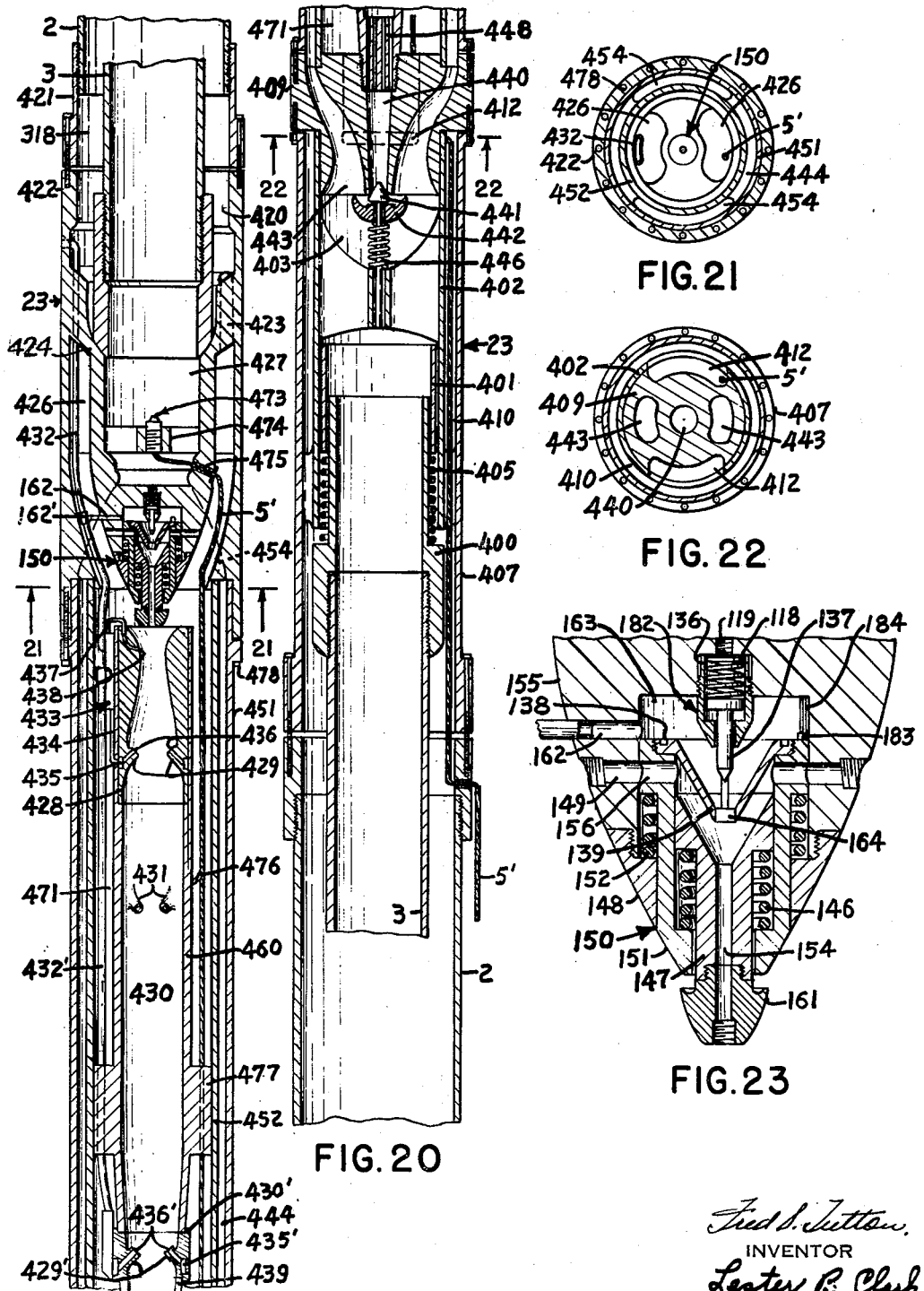

April 28, 1953    F. S. TUTTON    2,636,445
PRODUCTION METHOD AND APPARATUS
Filed Dec. 27, 1946    13 Sheets-Sheet 6

Fred S. Tutton
INVENTOR
Lester B. Clark
BY Ray L. Smith
ATTORNEYS.

April 28, 1953 F. S. TUTTON 2,636,445
PRODUCTION METHOD AND APPARATUS
Filed Dec. 27, 1946 13 Sheets-Sheet 7

Fred S. Tutton
INVENTOR
Lester B. Clark
BY Ray L. Smith
ATTORNEYS.

April 28, 1953 F. S. TUTTON 2,636,445
PRODUCTION METHOD AND APPARATUS
Filed Dec. 27, 1946 13 Sheets-Sheet 8

Fred S. Tutton
INVENTOR
BY Lester B. Clark
Ray L. Smith
ATTORNEYS

April 28, 1953  F. S. TUTTON  2,636,445
PRODUCTION METHOD AND APPARATUS
Filed Dec. 27, 1946  13 Sheets-Sheet 9

Fred S. Tutton
INVENTOR
BY Lester B. Clark
& Ray L. Smith
ATTORNEYS

April 28, 1953

F. S. TUTTON 2,636,445

PRODUCTION METHOD AND APPARATUS

Filed Dec. 27, 1946

Fred S. Tutton
INVENTOR
Lester B. Clark
BY Ray L. Smith
ATTORNEYS

April 28, 1953
F. S. TUTTON
2,636,445
PRODUCTION METHOD AND APPARATUS
Filed Dec. 27, 1946
13 Sheets-Sheet 11
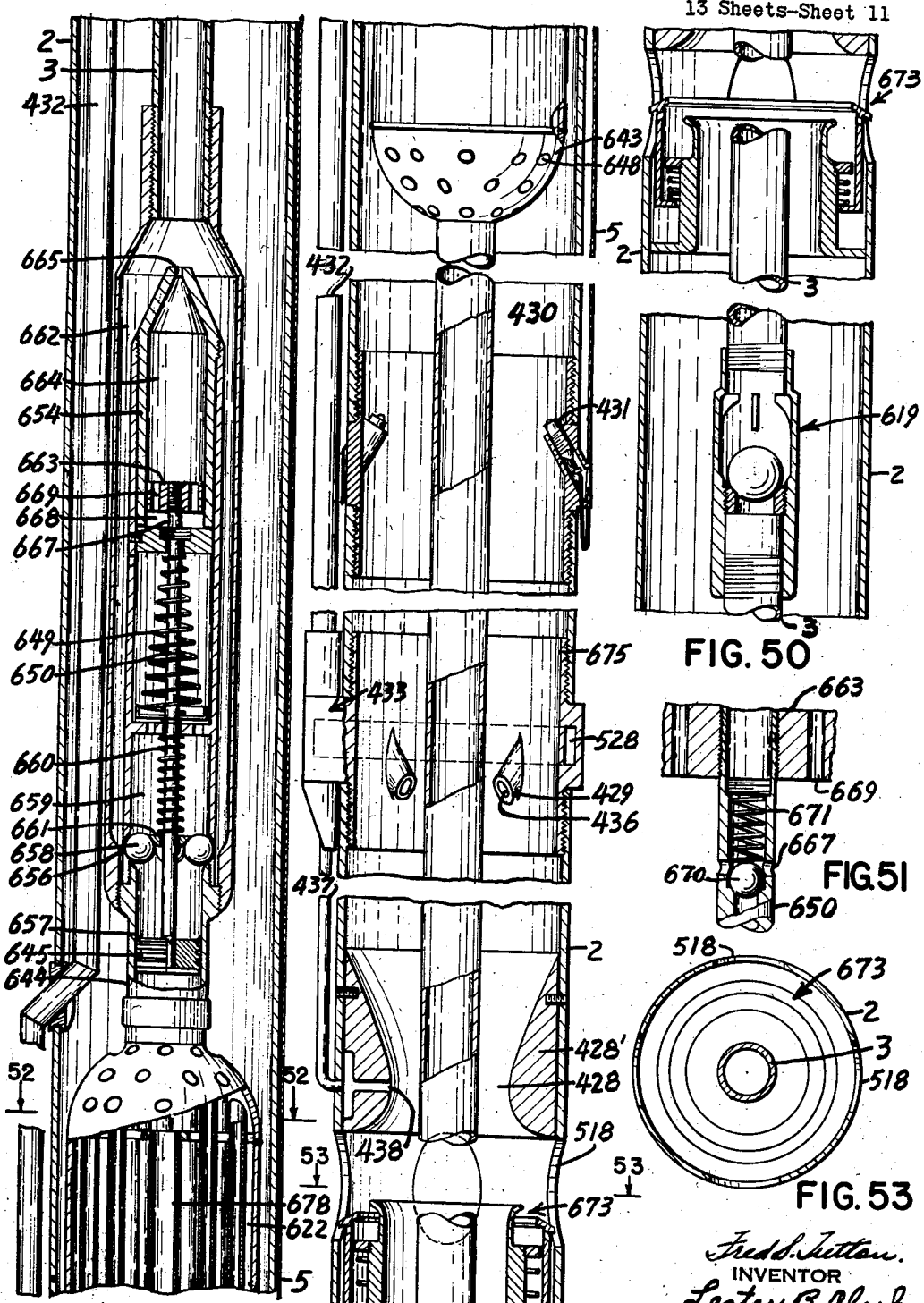

April 28, 1953 — F. S. TUTTON — 2,636,445
PRODUCTION METHOD AND APPARATUS
Filed Dec. 27, 1946 — 13 Sheets—Sheet 12

Fred S. Tutton
INVENTOR
By Lester B. Clark
& Ray L. Smith
ATTORNEYS

April 28, 1953  F. S. TUTTON  2,636,445
PRODUCTION METHOD AND APPARATUS
Filed Dec. 27, 1946  13 Sheets—Sheet 13

Fred S. Tutton,
INVENTOR
BY Lester B. Clark
& Ray L. Smith
ATTORNEYS

Patented Apr. 28, 1953

2,636,445

UNITED STATES PATENT OFFICE 2,636,445

PRODUCTION METHOD AND APPARATUS

Fred S. Tutton, Houston, Tex.

Application December 27, 1946, Serial No. 718,717

7 Claims. (Cl. 103—249)

The invention relates to a production method and apparatus for flowing wells.

This invention relates to the separation of well fluids in a well bore into one or more of their component parts and their subsequent ejection therefrom; a fluid recycling method in a well; control of the specific gravity and viscosity of formation fluids through the addition of heat energy and/or the products of combustion by the apparatus hereinafter described; the regulation of formation pressures communicating with a well bore, through a controlled range of pressures from a normal negative valve to a positive quantity in the well bore; the subsurface transfer of the intrinsic energy, including free energy, of an irreversible thermodynamic system employed in the production method of wells hereinafter described; the intermittent pressurization and release of pressures in strata penetrated by a well bore through the addition of fluids thereto by means of the combustion of a fuel-air mixture in one or more combustion chambers placed in the well bore; the dissolution of minerals in a formation and their ejection to the surface, by means of heating a fluid in the well bore and its circulation into a formation as a result of the combustion of a fuel-air mixture in one or more combustion chambers placed in said well bore.

Certain substances and fluids can exist in the formation which on production thereof it is desirable to separate in the most expeditious, economical and effective manner. This is true, for example, in oil wells where basic sediment, sand, and water occur with the production of oil, and which it has been found can be separated therefrom by subjecting the fluids to an increase of temperatures and pressures thereon, and by the agitation of same.

The specific gravity and the fluidity of the formation fluids can be increased by mixing therewith fluids having a higher specific gravity and a lower viscosity, and also, in the case of crude oil, can be accomplished to an extent through the addition of natural gases or lighter petroleum fractions agitated in the oil, absorption occurring as the pressures and the temperatures are increased.

In lowering the specific gravity of a fluid composed of several elements, it has been found that by heating the fluid, some of the lighter fractions thereof are liberated, the residue thus having a lower specific gravity than the original fluid. This is true of brines, water-sulphur, and sulphur-water mixtures, other mixtures and emulsions and various compounds of elements found thus in their natural state or are mixed, emulsified, or compounded with other fluids to facilitate commercial recovery thereof.

One of several factors in the production of such fluids, through means of the well bores thereinto, has been the effective application of energy in the well bore at a point or points therein dependent on and determined by the mechanical condition of the well bore and the formation or formations in communication therewith, to accomplish effective production of the formation fluids.

In order that the subsurface transfer of intrinsic energy, including free energy, of the irreversible thermodynamic system employed in the production method of wells hereinafter described can be accomplished, provision has been made for the securing in a well bore, as subsequently disclosed, of one or more combustion chambers into which a combustible fuel-air mixture is induced, ignited, and the resultant energy derived from the combustion of the fuel employed to flow said well or form such pressure, temperature and velocity changes in well fluids therein, and said formations in communication with said well bore as to accomplish the objectives of the invention. As hereinafter disclosed, each type of a form of apparatus embodying the invention is designed to accomplish one or more objectives of the invention. The method of the invention is sufficiently flexible to provide a subsurface transfer of energy in the well bore under all conditions of the operation of the apparatus in the well bore.

As disclosed above, combustion occurring in the well bore, as subsequently described, provides energy which can be supplied to any desired formation in communication with a well bore, the method of application of the energy being dependent on the number of strings of tubing secured in the well bore and other factors. By providing submergible combustion chambers and a novel method of applying the products of combustion formed therein, the operator thereof can pressurize formations in communication with the well bore for a period of time, store energy in a fluid therein, which can be utilized as effective energy to flow the fluids through the formation, and/or eject the fluids from the well bore.

Where it is desired that the dissolution of minerals in the formation be accomplished, and subsequently ejected from the well bore, a fluid such as water can be introduced into the well bore and heated to a high temperature therein by means disclosed, dissolving the minerals as a result thereof. The fluids can subsequently be ejected from the well bore by providing a suitable means, such as tubings in communication therewith, energy to effect said fluid flows augmented by the action of apparatus as herein disclosed.

With the foregoing in mind, the present invention has been devised, and it is an object of the invention, for ready adaption to the conditions determined for the production of formation fluids from any particular well bore in communication therewith, irrespective of the character of fluids therein, of the area of said well bore, and the depth thereof. It is adaptable also to adjust itself to varying conditions of flow in the well bore, to flow the well, to repressure or pressurize said formations, and subsequently extract the fluids therefrom, to heat the fluids in said well bore and, for any one of said conditions or combination thereof imposed in the well bore, said apparatus is adaptable also to mixing and agitating said fluids in said well bore, and of controlling the temperatures and pressures therein over a wide range of conditions in the well, and of the introduction of products of combustion in the fluid in the well, or the formations penetrated by a well bore; to increase the absorption of one fluid by another, or by a mixture of said fluids.

The invention also comprehends subjecting to high temperatures and pressures, elements whose molecular activity can be increased with an increase in temperature and pressure, and to introduce said elements into a fluid in a well bore or a formation penetrated by the well bore for the purpose of extracting therefrom other elements in the production of fluids from the formations. Thus, the free energy change where any given chemical change can occur in the system of the invention, such as the combining of nitrogen and CO and $CO_2$ at high temperatures with other elements, is accomplished in other energies in transit resulting from the combustion of the fuel utilized in the well.

Another object of the invention is to provide a method and apparatus employing one or more combustion chambers in a well bore, operable separately or simultaneously through the introduction of air thereto and to supply thereto a suitable combustible, which can be the fluid produced from the formation penetrated by the well bore, or introduced into the combustion chambers from a foreign source to form a combustible mixture therein, and igniting same for the purpose of flowing the well.

Another object of the invention is to provide method and apparatus for the pressurization or repressuring of a subsurface stratum by and through the addition of the products of combustion singularly or in combination with other fluids, thereto at greater pressures and temperatures than those existing in the formation by means of apparatus such as that hereinafter described.

Still another object of said invention is to provide method and apparatus for the separation of a fluid in a well bore into one or more of its component parts by means of heating, agitating and introducing thereto another fluid, the products of combustion, or the products of combustion and other fluids.

A further object of the invention is to provide method and apparatus wherein a fluid can be recycled in a well bore, from the well into a formation through the addition of heat energy in the well bore derived from combustion therein.

A still further object of the invention is to provide method and apparatus for the separation of a fluid in a well into one or more of its component parts by means of heating same in the well bore.

Another object of the invention is to provide method and apparatus for decreasing the specific gravity and viscosity of a fluid in a well bore by liberating the lighter elements in said fluid through the application of heat energy in said well bore.

Still another object of the invention is to provide method and apparatus for the regulation of pressures existing in a well bore, tubing, casing, or open hole, from a normal negative value to a positive quantity, and for the controlling of same by means of one or more combustion chambers in a well bore of the character described.

It is also an object of the invention to provide method and apparatus for the subsurface transfer of the intrinsic energy, including energy resulting from a chemical change resulting from heating a fluid in a well bore and/or the combining therewith of the products of combustion in the well bore containing one or more combustion chambers therein.

Another object is to provide method and apparatus for the intermittent pressurization and release of pressures in formations penetrated by a well bore by means of providing one or more combustion chambers in the well bore; to effect pressure and temperature changes therein to extract fluids from the formation.

Still another and more specific object is to provide means for suitably regulating and propagating a flame in one or more combustion chambers in a well bore by regulating the amount of air flowing thereinto.

Another object is to provide in a well bore one or more combustion chambers, igniters therefor, and means for supplying electrical energy to said igniters to effect the combustion of an inflammable mixture in the chambers.

A further object is to provide a device including a velocity tube or tubes, communicating with and forming an outlet for a combustion chamber in a well, producing a controlling effect upon the influx of air and fuel and their subsequent mixture in inflammable proportions in said combustion chamber, their ignition and flame propagation therein.

Still another object is to provide means comprising a throttle mechanism in one or more combustion chambers in a well bore, said means being operable as a function of the flow of a fluid to control the passage of fluids to said chambers.

Other and further objects and advantages of the invention will be readily apparent when the following description is considered in conjunction with the accompanying drawings wherein:

Figs. 9 and 10 are successive, vertical sectional views, a part of which is in elevation, of an alternate form of the apparatus shown in Fig. 1;

Fig. 11 is a section across the fluid passages in the tubing carrier on the line 11—11 of Fig. 9;

Fig. 12 is a section across the fluid passages in the tubing carrier on the line 12—12 of Fig. 9;

Fig. 13 is an enlarged vertical sectional view of one form of a fuel metering valve apparatus;

Fig. 14 is an enlarged vertical section, partly in elevation of a part of a second form of a fuel metering valve apparatus;

Fig. 15 is a view in section, partly in elevation, of a part of the fuel metering valve apparatus, and is used in conjunction with that shown in Fig. 14 to form a unit;

Figs. 19 and 20 are successive, vertical sectional views, a part of which is shown in elevation, showing the details of one form of the apparatus shown in Fig. 2;

Fig. 21 is a sectional view across the upper tubing carrier on the line 21—21 of Fig. 19;

Fig. 22 is a sectional view across the lower tubing carrier on the line 22—22 of Fig. 20;

Fig. 23 is a vertical sectional view, a part of which is in elevation, of one form of a throttle mechanism;

Figure 3:
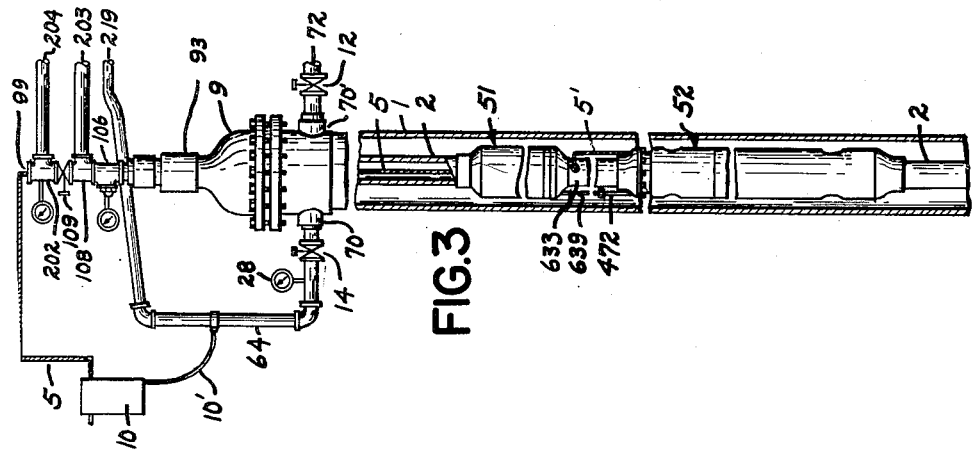
Fig. 3 is a diagrammatic view of a third form of the invention secured in a well bore and utilizing a single string of tubing within the well casing.
Figure 32:
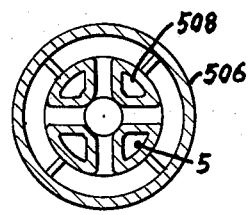
Figure 31:
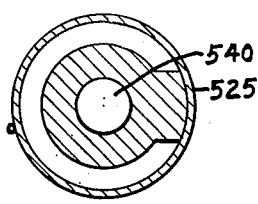
Figure 30:
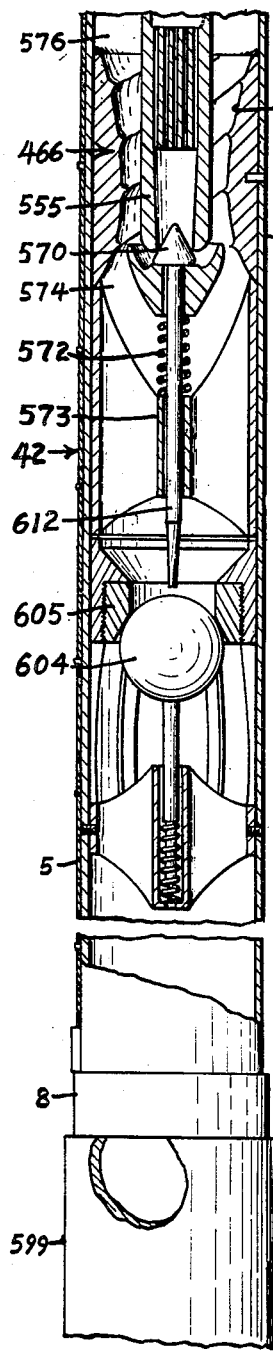
Figure 29:
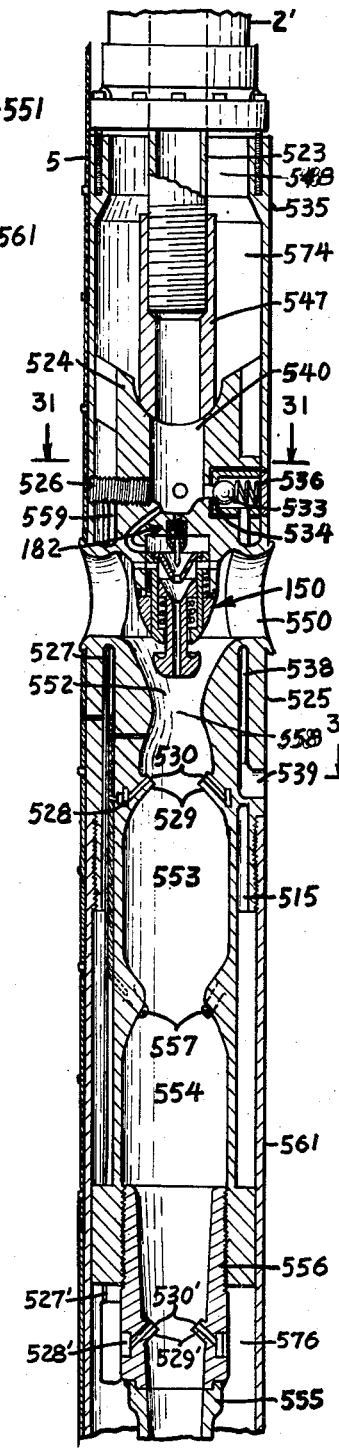
Figure 28:
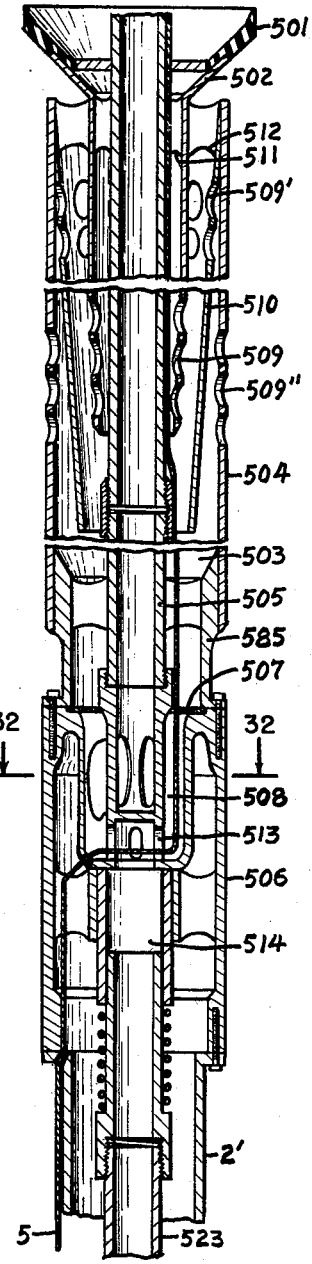
Figure 33:
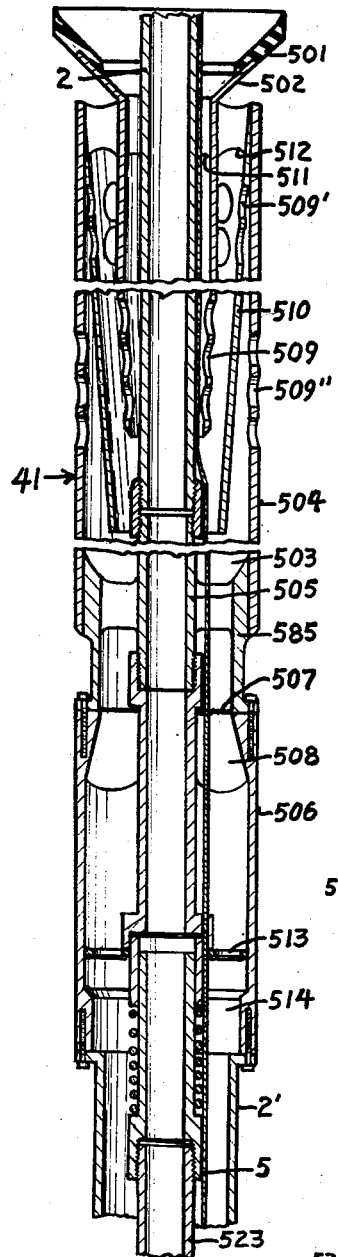
Figure 34:
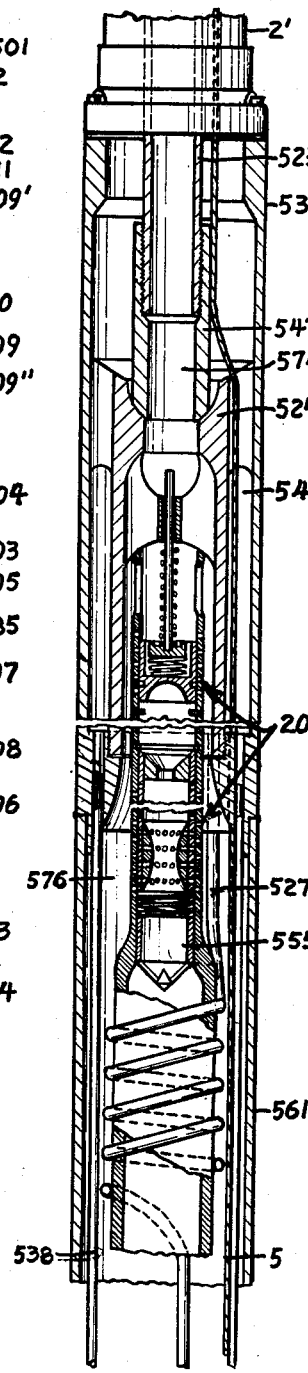
Figure 35:
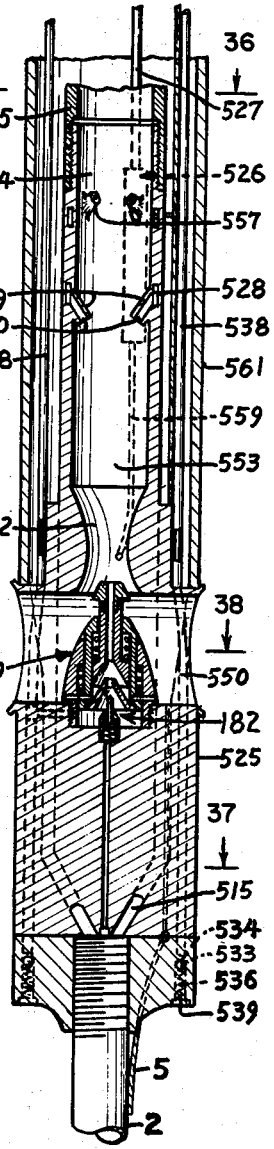
Figures 36, 37, 38, 39, 40, 41:
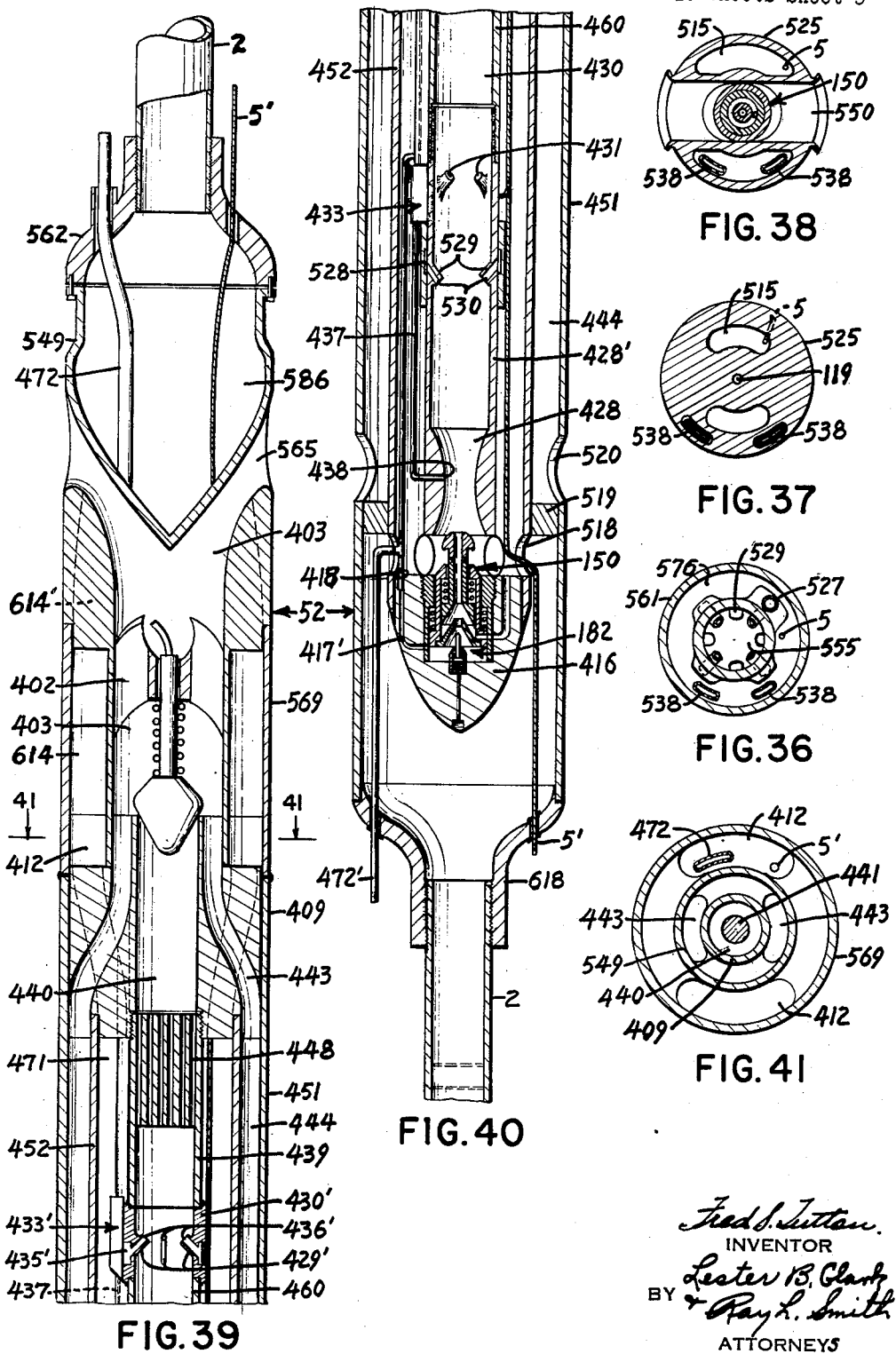
Figure 47:
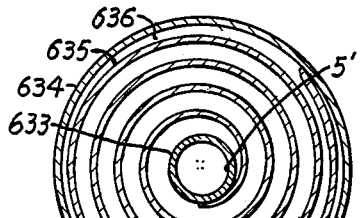
Figures 44, 45:
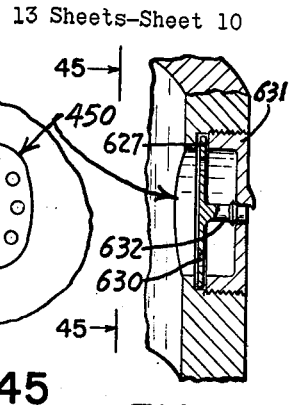
Figure 42:
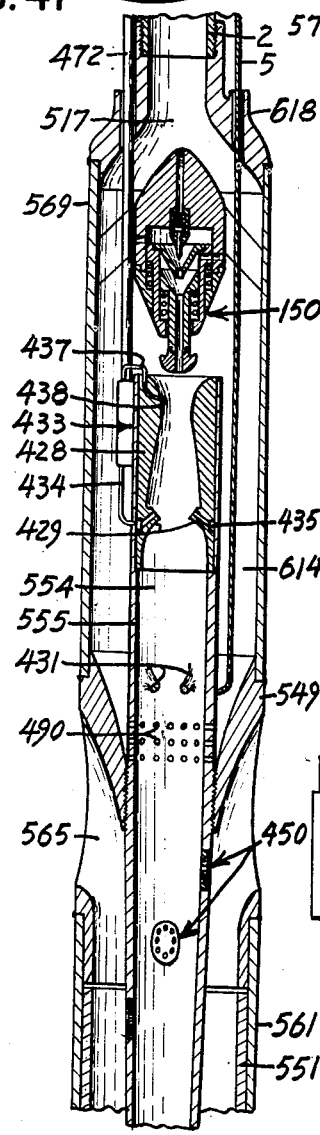
Figure 43:
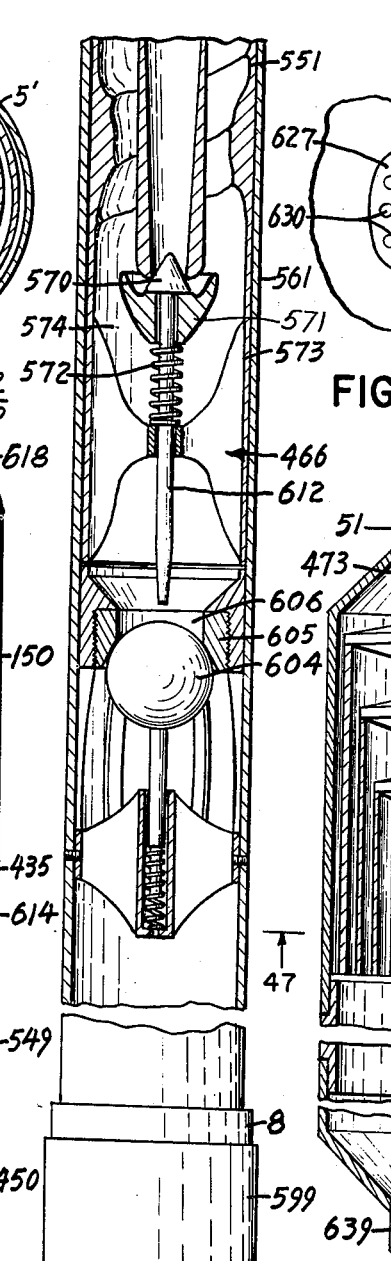
Figure 46:
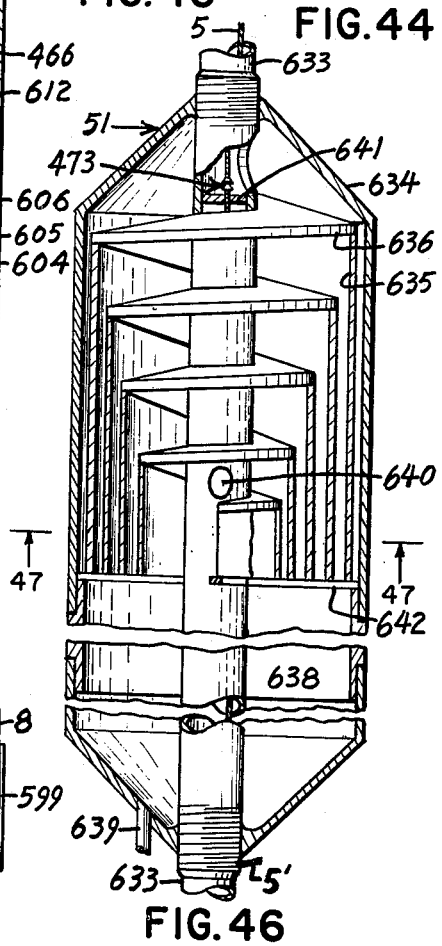
Figure 54:
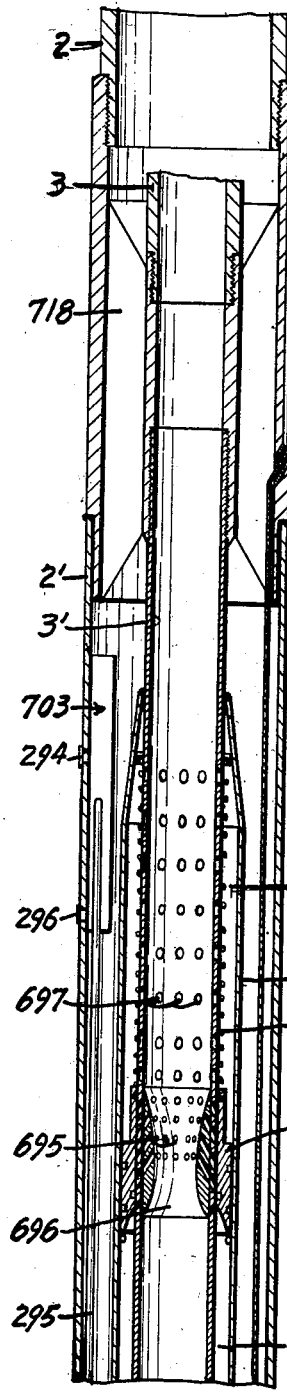
Figure 55:
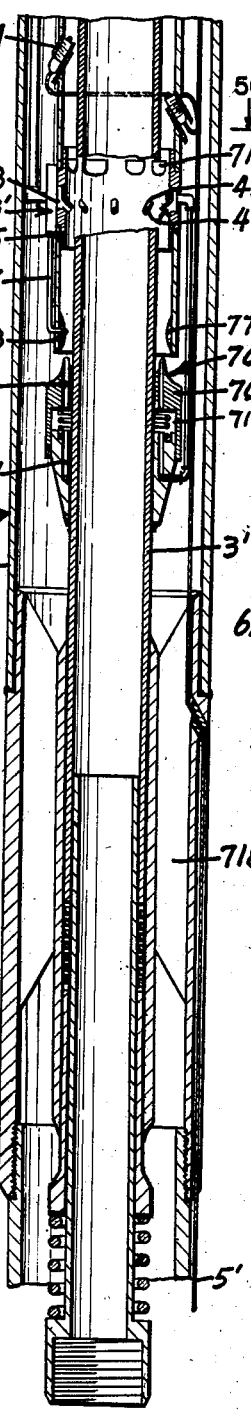
Figure 56:
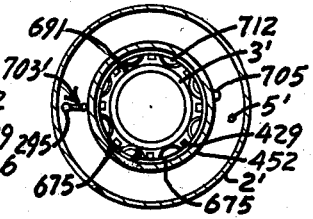
Figure 57:
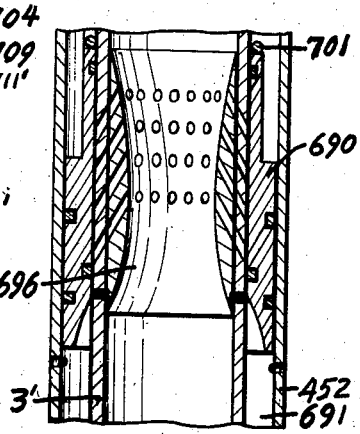
Figure 52:
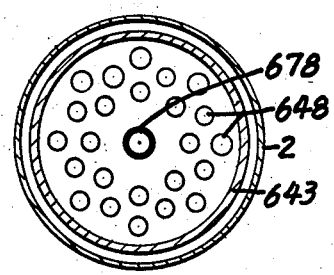
Figure 58:
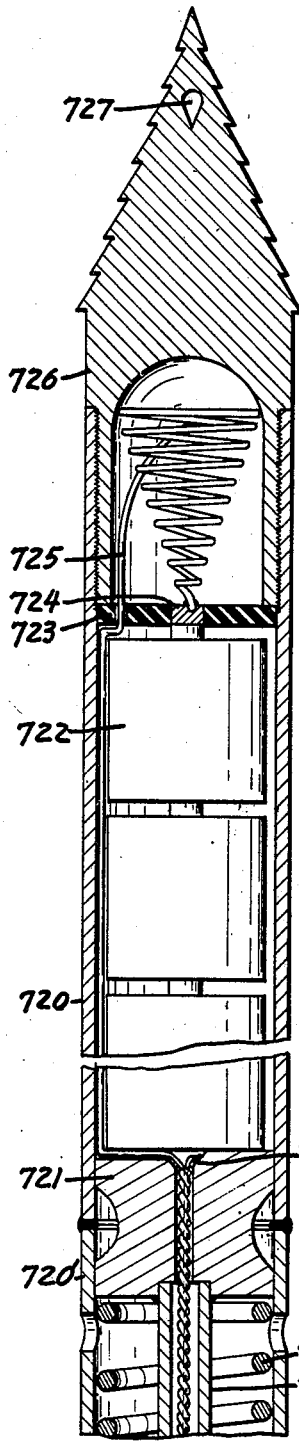
Figure 59:
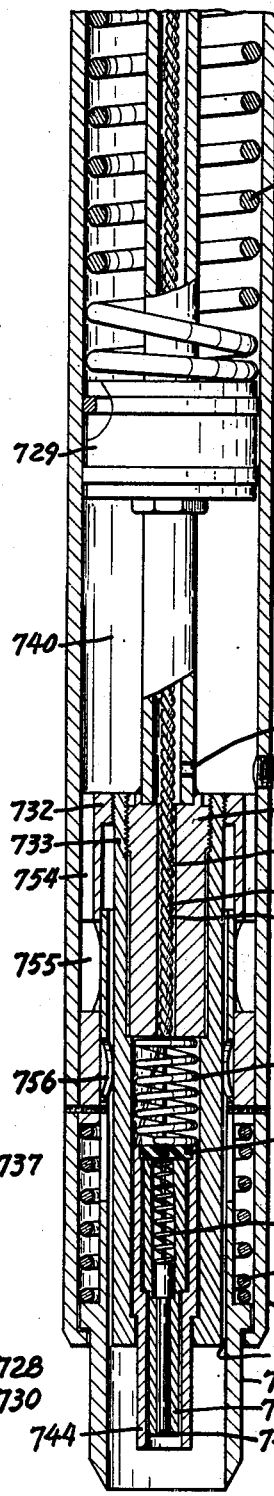
Figure 60:
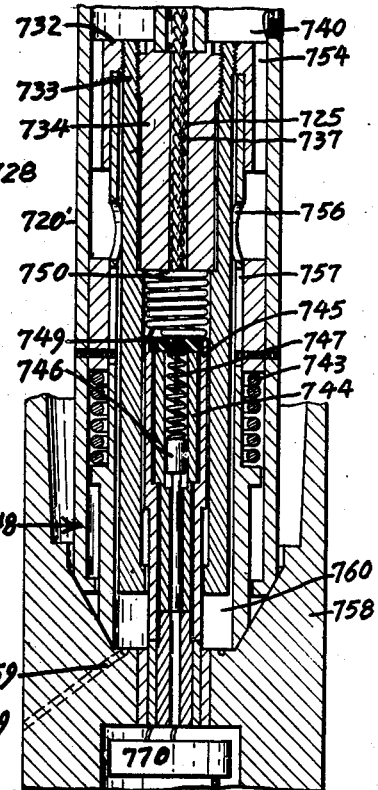
Figure 61:
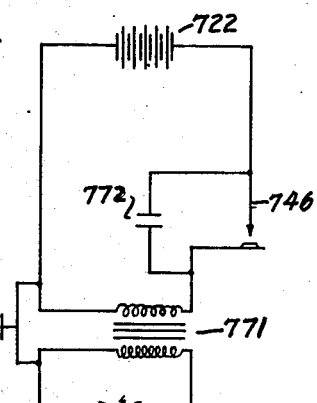

Figs. 28, 29, and 30 are successive, vertical sectional views of a form of the invention utilizing a single string of tubing;

Fig. 31 is a section across the fluid passages on the line 31—31 of Fig. 29;

Fig. 32 is a section on the line 32—32 of Fig. 28;

Figs. 33, 34, and 35 are successive, vertical sectional views of an alternate form of the invention utilizing a single string of tubing;

Fig. 36 is a section on the line 36—36 of Fig. 35;
Fig. 37 is a section on the line 37—37 of Fig. 35;
Fig. 38 is a section on the line 38—38 of Fig. 35;

Figs. 39 and 40 are successive, vertical sectional views showing a form of the invention using spaced parallel tubing strings for supplying fuel and air to the device;

Fig. 41 is a section on the line 41—41 of Fig. 39;

Figs. 42 and 43 are successive, vertical sectional views, a part of which appears in elevation, of an alternate form of apparatus utilizing a single string of tubing;

Figs. 44 and 45 are details showing a valve mechanism comprising an element of the apparatus;

Fig. 46 is a vertical sectional view of a fuel-air separator apparatus comprising an element of the invention as shown in Fig. 3;

Fig. 47 is a section taken on the line 47—47 of Fig. 46;

Figs. 48, 49, and 50 are successive, vertical sectional views, a part of which appears in elevation, of an alternate form of the apparatus utilizing two concentric tubing strings and includes a separate fuel string cooperating therewith;

Fig. 51 is an enlarged sectional detail of the valve control piston comprising a part of the device as shown in Fig. 48;

Fig. 52 is a section on the line 52—52 of Fig. 48;
Fig. 53 is a section on the line 53—53 of Fig. 49;

Figs. 54 and 55 are successive, vertical sectional views, a part of which is in elevation, of still another form of the apparatus utilizing two concentric strings of tubing;

Fig. 56 is a sectional view across the combustion chamber on the line 56—56 of Fig. 55;

Fig. 57 is an enlarged sectional detail of the venturi comprising an element of the apparatus as illustrated in Fig. 54;

Figs. 58 and 59 are successive, vertical sectional views partly in elevation, of a form of the invention embodying a local source of electrical energy within the well for effecting ignition of the power fluid;

Fig. 60 is an enlarged sectional detail showing the relative position of the lowermost parts of the device shown in Figs. 58 and 59 when the device is lowered to seating position within a well;

Fig. 61 is an electrical circuit diagram for the low tension ignition system utilized in the invention as shown in Figs. 58 and 59.

Figure 1:
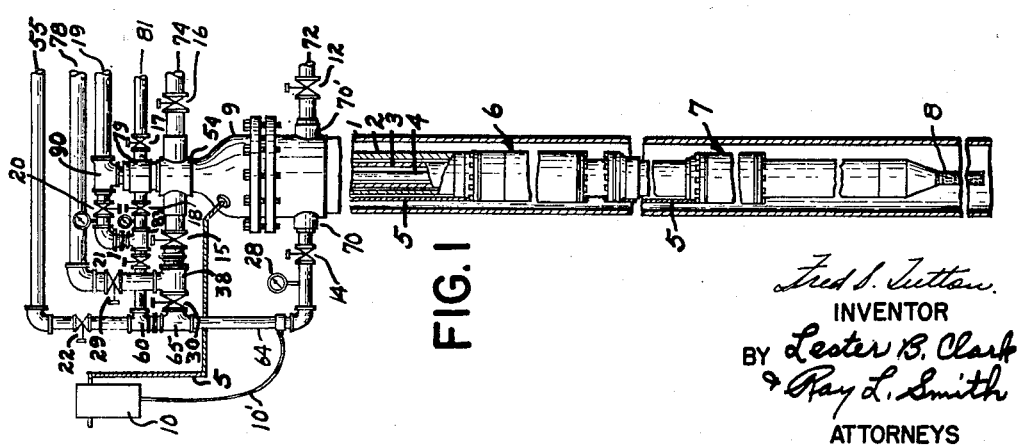
Fig. 1 is a diagrammatic view of one form of the invention installed in a well bore and utilizing three concentric strings of tubing within the well casing.

In Fig. 1 the well bore is illustrated as containing a well casing 1 which extends down into the well bore to a point adjacent the productive formation and may carry a suitable screen or strainer (not shown) in some locations, while in other locations the flow of fluids is directly from the formation into the well bore.

In some instances flow of fluids is permitted into or out of the casing 1 to the formations adjacent thereto through openings, such as shot holes or the like, in the casing 1 at several different levels therein.

In accordance with the invention the well bore can produce simultaneously from more than one formation, and one formation can be repressured while the well is producing from yet another formation.

Figures 4, 5:
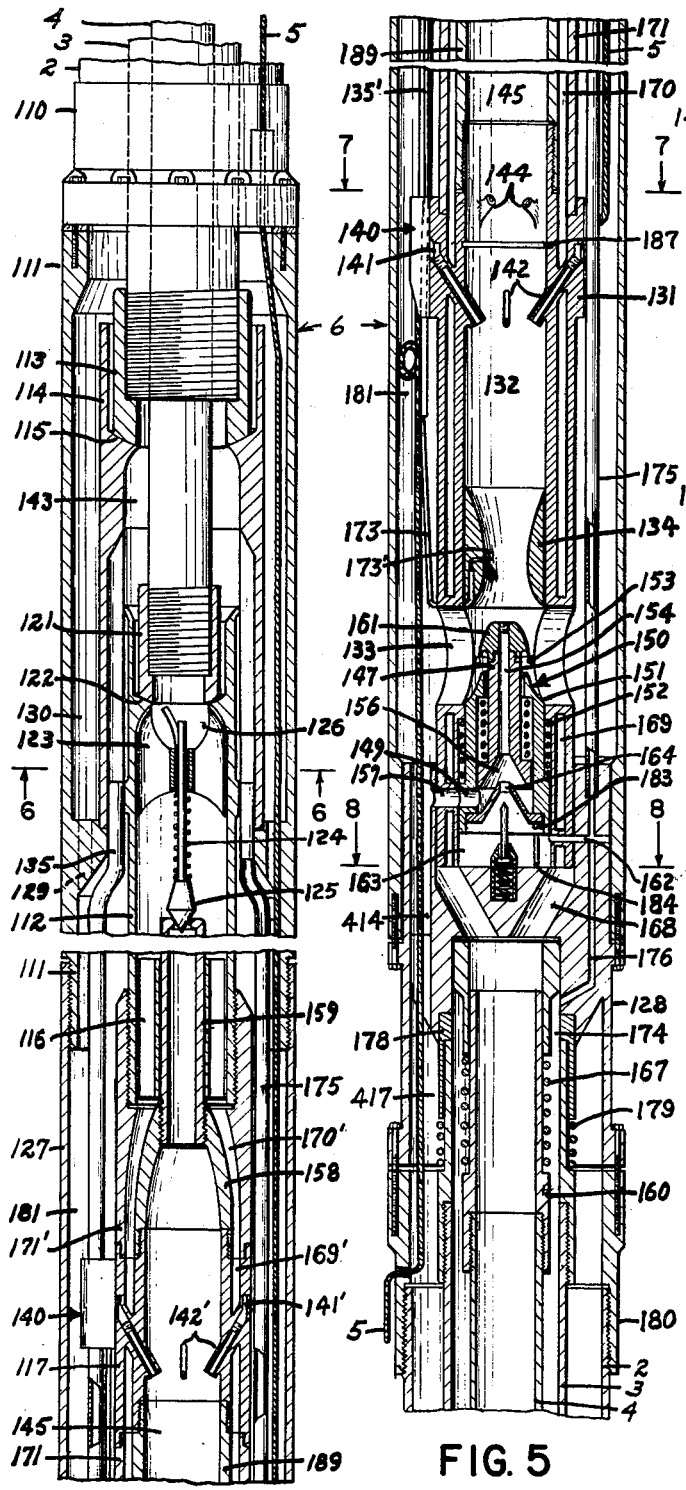
Figs. 4 and 5 are successive vertical sectional views, a part of which is in elevation, of a form of the apparatus shown in Fig. 1.
Figure 6:
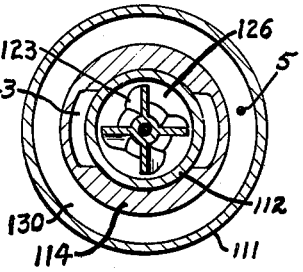
Fig. 6 is a section across the fluid mixing chamber on the line 6—6 of Fig. 4.
Figure 7:
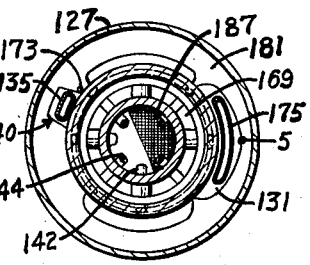
Fig. 7 is a section across the combustion chamber on the line 7—7 of Fig. 5.
Figure 8:
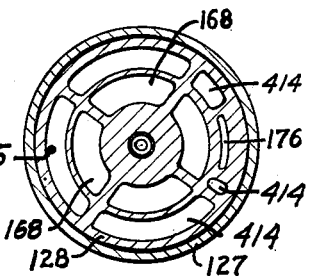
Fig. 8 is a section across the fluid passages in the tubing carrier on the line 8—8 of Fig. 5.

The casing 1, in Fig. 1, contains three concentric strings of tubing 2, 3, and 4 therein, communicating with a power unit 6, as illustrated more specifically in Figs. 4 and 5. A second power unit 7 (a bottom hole type of the power unit), as illustrated in Figs. 9 and 10, is secured to and communicates with the unit 6 by way of the annulus formed by the tubings and the well casing.

The number of the power units used and their interval of spacing in the well bore depends on the viscosity of fluids therein, the depth of the well bore and its mechanical peculiarities, the character of the formations and the fluids therein and, as well, the objectives to be achieved by use of the invention.

The tubing 3, in Fig. 1 is secured to the power unit 7 and provides means of communication for the well fluids with the power unit.

An ignition cable 5 is secured mechanically to the exterior of the tubing 2, in a convenient manner as by clips or straps thereto at intervals thereon, and provides means for conducting a high tension electrical current, for ignition purposes to the power unit 6 and the power unit 7, in the well bore, as follows:

The ignition cable 5 is connected to a suitable source of electrical energy through the switch 10 at the surface. This cable passes through the casing head 9 and thence passes downwardly to the respective power units.

The ignition cable 5 is connected electrically to the outer extremities of the electrodes of the igniters in the power units in the well bore in a suitable manner and continuity of insulation of the conductors in the cable is maintained throughout the length of the cable. Hence, the flow of electrical energy from the switch 10 is through the ignition cable 5 and the electrodes secured into the combustion chambers so that an electrical spark is formed within the combustion chambers to ignite an inflammable mixture therein, as will be more fully described hereinafter.

The electrical circuit is preferably completed by utilizing the tubing in the well bore as an electrical conductor and a ground wire 10', secured to a well head tubing, may be used to assure an adequate ground of the one side of the electrical circuit at the switch 10.

The upper section of casing head 9 is secured to the lower section thereof in a suitable manner, and the well casing 1 secured thereto is also secured in the well bore as by means of cement therearound, in a conventional manner. The lower section of the casing head carries wing connections 70 and 70', having communication with the interior of the casing head. The wing connection 70' is connected to pipe line 72 and valve 12 therein enables the control of fluid flow through this line to the well head. It seems apparent that this construction provides a passage communicating with the annulus formed by the casing 1 and the tubing 2. In a similar manner the wing connection 70 is connected to pipe conduit 64 having valve 14 therein, a pressure gauge 26 being provided in the conduit. It is to be noted that the assembly just described is also shown in Figs. 2 and 3, and like reference characters are used to designate like parts.

Referring to Fig. 1, the flow line 64 includes T connection 65 communicating with valve 30 and with upper T 60 which, in turn, communicates with valves 21 and 22. The pipe 55 is connected directly to the valve 22.

Figure 2:
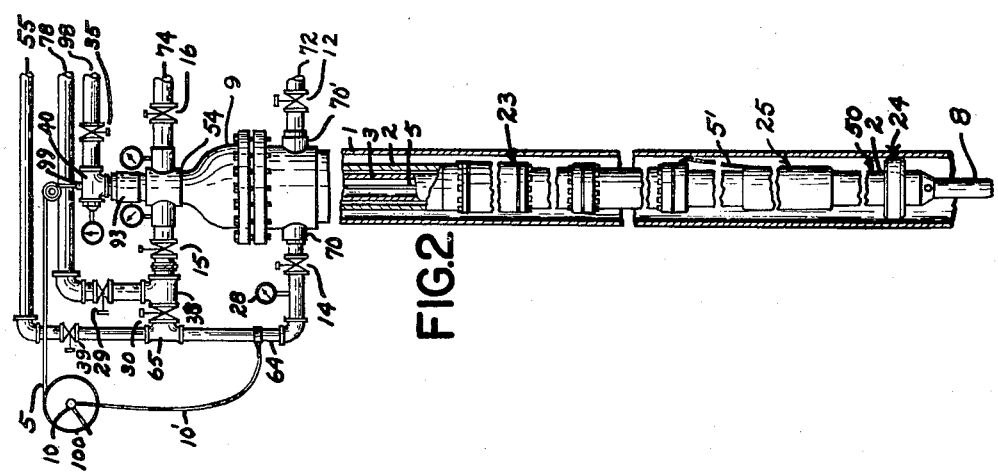
Fig. 2 is a diagrammatic view of a second form of the invention secured in a well bore and using two concentric strings of said tubing within the well casing.

In Figs. 1 and 2, the casing head 9 carries the four-way connection 54 to which the tubing 2 is internally connected. The pipe 74 is connected through valve 16 to the connection and the opposite opening in the connection communicates with the valve 15 and in turn with T 38 interposed between this valve and the valve 30. The T 38 also communicates through valve 29 with the pipe 78.

Referring again to Fig. 1, the four-way connection 79 is secured to the upper end of the four-way connection 54. The tubing 3 is internally connected to this connection 79 so that the pipe 81, attached thereto, communicates through valve 17 to the annulus formed by the tubings 3 and 4. Valve 18 is also provided in a line communicating with this annulus, and the opposite side of this valve is connected through T 83 and valve 21 to the line 64. The upper opening in the T communicates with valve 20 which is in turn connected to T 90 to which flow line 19 is attached. The downward opening in the T 90 is connected to the tubing 4 and by virtue of this construction fluid may flow to or from pipe line 19 and/or the valve 20 and the tubing 4 within the well.

In Fig. 2, the upper end of the four-way connector 54 is connected through coupling 93 to the T 40 and the tubing string 3 is connected interiorly to communicate with the passage in this T. A pipe line 98 is connected through valve 35 to the T whereby ingress or egress of fluid to and from the tubing 3 is provided in this form of the invention. The ignition cable 5 passes from the drum 100 to and through a packing gland 99 in the T 40. It is intended by this construction that the cable 5 may be lowered into the well to effect ignition after which sustained combustion will maintain operation of the device while the cable may be withdrawn upon the drum 100.

As will more fully appear, the lower end of cable 5 may be detachably connected to the igniter means within the power unit 23. A supplemental cable 5', having a common connection with such igniter means extends downwardly to the power unit 25 and supplies necessary electrical energy thereto when the cable 5 is lowered into the well and the switch 10 is closed.

The power unit 23 shown in Fig. 2 is preferably constructed as shown in Figs. 19 and 20 while the power unit 25 of this embodiment is shown in detail in Figs. 54 and 55. A packer 24, of any suitable construction is provided between the tubing 2 and the casing 1 to form upper and lower chambers above and below such packer, a bottom hole valve 50, such as that shown in Fig. 16, being provided in this production assembly.

In Fig. 3, the tubing 2, in the well casing 1 in the well bore, is shown as including an air separator 51, as further illustrated and described in Fig. 46. A power unit 52, as shown in detail in Figs. 39 and 40, and as further described herein, is secured in the tubing string 2 below the separator 51. Reference is made to the fact that the separator 51 and the power unit 52 are interconnected by a section of tubing 633 of limited length. The fuel tubing 639 and fuel conductor tubing 472 form a continuous conduit for transmitting fuel from the separator 51 to the power unit 52. It is to be understood that provision is made for the installation of an additional power unit or units, where required.

The collar 93, secured to the upper section of the casing head 9, is connected seriatim to T's 106 and 108, valve 109, and T 202. The tubing string 2 is connected to the interior of the collar 93 whereby there is a common passage upwardly from the tubing through the assembly just described. Flow lines 203 and 204 enter T's 108 and 202 respectively, and the upper opening in the T 202 is provided with packing gland 99 for the passage of cable 5 as previously described in connection with Fig. 2.

Pipe connection 64 in this embodiment forms a continuation of the pipe line 219 to provide communication, through valve 14, with the annular chamber formed by the well casing 1 and the tubing string 2.

Referring again to Fig. 1, it is to be understood that the pipe connection 55 may selectively communicate with any of the annuli formed between adjacent tubing strings in the well bore. Also, the pipe connection 78, and the pipe connection 19 can, likewise, communicate with the several annuli formed in the well bore and in the well head.

It is therefore possible by means of the construction heretofore described and fabricated from fittings and connections readily available in the field, that the various annuli in the well can communicate through the pipe connection 55 with: (a) the atmosphere, (b) a suitable source of gas or other gaseous fluid, (c) the inlet or outlet of a gas-oil separator, (d) a source of fuel, and the like. It is believed apparent also that the pipe connections 19 and 78 may be selectively utilized for directing fluids to and from various chambers formed within the well bore and the control assembly is thus extremely flexible and capable of serving the various requirements in production in accordance with the invention. This arrangement is of importance where various combinations of power units, such as those illustrated herein, are installed in a well bore.

The pipe connection 81 normally provides a conduit between the annulus formed by the tubing 3 and the tubing 4, and a source of fluid or receiver, or to the atmosphere. The pipe connection 74 is the counterpart of the pipe connection 78, and provides a conduit between the annulus formed by the tubings 2 and 3, and an external source of fluid or receiver.

Pipe connections 72 and 64 communicate with the annulus formed in the well bore by the well casing 1 and the tubing 2. Normally, fluid flows into the well bore for recycling and repressuring purposes by means of either of these connections although fluid flows from the well bore are permissible through these connections.

Referring again to Fig. 1, with the type of power units designated and which will presently be described in detail, normally air is introduced from a suitable source into the annulus formed by the tubings 2 and 3. A combustible of a suitable character, such as a natural gas, petroleum, or derivatives thereof, is normally introduced into the annulus formed by the tubings 3 and 4 in said well bore as by means of gravity flow or under selected pressure.

The air and combustible are intermixed in suitable inflammable proportions and are ignited in the combustion chambers in the power units in the well bore by means of said electrical energy conveyed thereto by the ignition cable 5. The products of combustion resulting from the ignition of the inflammable mixture are conducted to surface means in communication therewith by the tubing 4.

The fluids, for recycling purposes, including flow from the well bore, can be admitted to the annulus formed by the well casing 1 and the tubing 2.

A form of the power unit 6 of Fig. 1 is shown in detail in Figs. 4 to 8 inclusive. In this unit the tubing 2 is secured to a flange 110, and this flange is in turn secured to a tubing carrier 111 whereby the unit assembly is supported by the tubing.

An upper section of the tubing 3 terminates at its lower end in a pressure connector 113 seated in a cone recess in the upper end of spider 114 concentrically fitted into the tubing carrier 111, there being a seal 115 between the male pressure connector 113 and the spider 114. This, in effect, extends the annulus formed by the tubings 2 and 3 in the well bore into the tubing carrier 111. The lower extremity of the spider 114 is sealably secured upon an axially extending cylinder integral with the tubing carrier 111, and in this manner there is provided an annular passage 130 about the spider 114 communicating with the annulus formed by the tubings 2 and 3. Passages 129 extend downwardly from the annular passage 130 to join the lower chamber 181 therewith.

In a similar manner an upper section of the tubing 4 carries the male end and terminates in a pressure connector 121 which rests within and forms a seal with the cone seat 122 of the cylinder 112. Passage 143 is formed by the spider 114 and the tubing 4, and communicates with the annulus formed by the upper sections of the tubings 3 and 4. Passage 143 also communicates with downwardly extending fuel pipes 135 and 174, of which the latter supplies fuel to a lower power unit or units.

Normally, air is conducted through the annulus formed by the tubings 2 and 3, and fuel moves downwardly through the annulus formed by the said tubings 3 and 4. As will subsequently be more fully described, the well fluids, and the products of combustion move upwardly through the tubing 4.

The cylinder 112 is provided with a chamber 126, which contains the spider 123 concentrically therein. The legs of the spider 123 are secured to the interior walls of cylinder 112 in the chamber 126. The spider 123 carries a hub therein which serves as a guide for the stem of valve 125, slidably fit therethrough and carries valve spring 124, retained in place by the hub of the spider 123 and the head of the valve 125, which seats upon the upper end of the velocity tube 159. The legs of the spider 123 are of such form as to give a swirling motion to fluids flowing thereover from the mixing chamber 126.

The power unit casing 127 is secured to the lower end of the tubing carrier 111, and segregates fluid flows in the interior of the power unit from well fluids in the annulus formed thereby with well casing 1, and hence is in effect a continuation of the tubing 2.

The lower tubing carrier 128 has the lower jet housing 131 concentrically secured thereto. This jet housing 131 has the jet bodies 142 formed therein, and the electrodes or igniters 144 are mounted in the combustion chamber 145. The tube 189 forms a part of the combustion chamber and interconnects the lower jet housing 131 and the upper jet housing 117.

A throttle mechanism 150, subsequently described, is concentrically secured in the base of the jet housing 131, prior to the assembly of the jet housing with the lower tubing carrier 128.

A conical tube 158 is secured to the upper jet housing 117 and to the lower end of the velocity tube 159 upon which the valve 125 seats as already described. The valve 125 tends to remain seated upon the velocity tube 159 due to the compression of the valve spring 124.

The lower jet housing 131 has ports 133 formed therein, said ports providing communication to the interior of the carrier 131 and to the annulus 181 as follows:

The power unit casing 127 is secured to the lower end of the upper tubing carrier 111. The upper fluid separator tube 171 has its opposite ends connected to the upper jet housing 117 and the cylinder 112.

The upper and lower jet housings 117 and 131 are interconnected by concentric tubes 189 and 171 to form an annulus 170 for the passage of well fluids upwardly to the chamber 126 from the passage 169 formed in the walls of the lower jet housing 131. The tube 171, the jet housings 117 and 131, and the separator tube 171 cooperate with the surrounding casing 127 to form the chamber 181 which is in effect a continuation of the annulus formed by the tubings 2 and 3. Passages 129 formed in the body of the upper tubing carrier 111 provide communication from the passage 130 previously described, to the annulus 181.

The chamber 181 communicates through ports 414 with the annulus 417, in the lower tubing carrier 128, formed by the tubing carrier and the sleeve 178 which fits slidably upon the reduced upper end of the lower section of the tubing 3. The sleeve 178 is constantly urged upwardly by compression spring 179 to maintain a seal between the lower section of tubing and the lower tubing carrier 128.

The lower tubing carrier 128 interconnects the power unit casing 127 and the flange connection 180 which is in turn secured to a lower section of the tubing 2.

The lower section of the tubing 4 has a disconnect sleeve 160 at its upper end and this sleeve is constantly urged upwardly by the spring 167 into sealing engagement with the lower tubing carrier 128.

Ports 168 in the carrier 128 cooperate with passages 169, 170, 169' and 170' in sequence to conduct fluids from the lower portion of the tubing string 4 to the chamber 126 and thence to the bore of the upper portion of the tubing or flow string 4 for removal from the well bore as will be further explained.

The fuel pipe 135 conducts fuel downwardly to spaced metering valves 140 through which the fuel is introduced respectively to the lower and the upper jet carriers 131 and 117. Similarly, the fuel pipe 175 conducts fuel downwardly to the passages 162 and 176 in the tubing carrier 128. Fuel conducted through the passage 176 is discharged into the annulus 174 for downward flow and use in a succeeding power unit or units. The fuel flowing through the passage 162 is discharged into chamber 163 in the tubing carrier 128 for use in a manner that will presently appear.

A Venturi body 134 is secured in the interior of the jet housing carrier 131 and has a wall port 173' with which the Venturi tubing 173 communicates to serve a purpose more fully explained in the description of Fig. 13 hereinafter.

To describe the operation of the device and supplement the description thereof, it is further explained that air moves downwardly through the annulus formed by the upper section of the tubing 2 and tubing 3, and the passages 130 and 129 and thence into the annulus 181. A portion of the air is diverted through the ports 133, in the jet housing carrier 131, as by moving from a high pressure area to that of a lower pressure area formed as subsequently described. The remainder of the air passages through the ports 414 to be conducted downwardly for use in lower power units as above explained.

That portion of the air stream diverted through the ports 133 moves over the throttle mechanism 150 thence through the Venturi body 134, and into the interior of the jet housing carrier 131, having the fuel-air chamber 132 therein. Air in the chamber 132 is mixed with fuel supplied thereto through the jets 142 to form an inflammable fuel-air mixture within such chamber.

Fuel introduced to the annulus formed by the concentric arrangement of tubings 3 and 4 flows as by gravity through the passage 143 to the fuel metering valves 140, and thence to and through annuli 141 and 141' to the jets 142 and 142' whereby the metered fuel is introduced to the mixing chamber 132 and the combustion chamber 145.

It is understood, of course, that the introduction of air and fuel to the mixing chamber 132 shall be so coordinated as to provide an inflammable mixture. The inflammable mixture in the fuel-air chamber 132 moves upwardly through the mixing screen 187 secured to interior walls of the jet housing carrier 131 and is thus agitated whereby uniformity of the mixture is assured. The inflammable mixture thence passes over electrodes 144 in the combustion chamber 145 and is ignited therein as by means of an electric arc formed by energy supplied through the cable 5. The mixing of the fuel and air in the fuel-air chamber 132 is a continuous process, compression of the fuel-air mixture being achieved by the counter flow of the fuel and air thereinto.

The movement of the fuel-air mixture from the fuel-air chamber 132 to the combustion chamber 145 is caused initially, and at low pressures and temperatures, by the impact of air entering through the Venturi body 134. The character of the flame in the combustion chamber is similar to that of a torch. Where fuel and air pressures are rapidly increased, several phenomena occur depending on the character of fuel used and configuration of the combustion chamber. One phenomenon is that as the flame speed approaches the inherent combustion chamber resonance point, it results in rapid pressure fluctuations in the fuel-air mixture due to the nature of its compressibility, and also in the creation of a low pressure area at the base of the flame due to the rapid expansion of the gases of combustion. This low pressure area can be moved longitudinally in the combustion chamber as a function of fluid flows in the mixing and combustion chambers 132 and 145. Therefore, the point in the apparatus at which combustion starts to occur, the base of the flame, is controlled primarily by limiting the supply of oxygen, hence, in this instance, air flowing through the venturi 134, and over the automatic throttle mechanism 150, the functioning of which will now be generally explained. A more specific explanation is had in the description of Fig. 23.

That portion of the air entering ports 133 and which moves through the venturi 134, flows over an air foil comprising a part of the throttle piston 151 in the throttle mechanism 150 protruding into the air passage formed by the ports 133 in the jet housing carrier 131. The piston 151 fits slidably and rather loosely in the base of the jet housing carrier 131 to preclude its freezing thereto at high temperatures, and its freedom of motion is further insured by the spring 152 on which it rests.

As air velocities through the ports 133 are increased, a low pressure area is formed along the sides of the throttle head 161, which is fitted into the throttle piston 151. The throttle head and the throttle piston will thus tend to move as a function of velocity flows and their inherent weight, due to the formation of an air foil created by the movement of air flowing thereover.

Stops 153 are provided to preclude the momentum of slidable parts in the throttle mechanism 150, under some circumstances of operation, from thrusting themselves into the venturi 134, thus closing the ports 133.

A central aperture 154 in the throttle head 161 and the shank 147 thereof communicates with the chamber 156 therebelow which in turn communicates with ports 414, previously described by way of radial passage 157. This air at a comparative higher pressure moves through the aperture 154 by the difference in air pressures at the extremities of said passage, and removes any extraneous material between the jet housing carrier 131 and the throttle piston 151, and resutls in further functioning of the throttle piston 151 as a function of the static and kinetic forces of the air moving over the air foil formed at the apex of the throttle head 161.

A part of the fuel is introduced into the power unit through the aperture 154 since the passage 162 in the lower tubing carrier 128 communicates with the chamber 163, formed in the base of the throttle piston 151 and the jet housing carrier 131. A needle valve assembly is mounted in the chamber 163 and the needle thereof is adapted to slidably enter the opening 164 in the base of the throttle piston.

The throttle piston 151 is slidably but non-rotatably mounted within the jet housing carrier 131 as by means of key 183 on the throttle piston moving within complementary keyway 184 in the carrier.

It is observed that the throttle mechanism 150 obviates certain calculations in size determinations of the venturis, such as venturi 134, and thus increases the utility of the power unit. As described above, the throttle mechanism 150 cooperates in proportioning of air to the power units in a system comprising one or more of the power units installed in the well bore.

Combustion chamber 145, formed as described, communicates with the velocity tube 159, through which the products of combustion flow in expanding. These gases then pass into the chamber 126 which communicates with the tubing 4.

The velocity flow of the products of combustion engendered by the expansion of the products of combustion in the velocity tube 159 compresses the spring 124 by impinging on the head of the valve 125, lightly retained on its seat in the upper extremity of the velocity tube 159 by the spring 124, as the kinetic energy of the products of combustion exceeds the static pressure of the spring 124.

Well fluids enter the power unit through a lower section of the tubing 4 due to their hydrostatic head or to the action engendered by a lower power unit in the well. Such fluids move upwardly through the ports 168 and the apertures 169 to and through the annuli 170, 169', and 170', and thence into the mixing chamber 126 over the fins 116, secured as by welding to the outer surface of the velocity tube 159. The fins 116 are formed in a vertical spiral direction relative to the velocity tube 159, to increase the surface area thereon exposed to the well fluids and to limit lateral movement of the velocity tube 159.

Due to energy relationships previously disclosed and further described herein, well fluids are propelled from the mixing chamber 126 through the upper section of the tubing 4 and thence to surface means in communication therewith, by aeration of the well fluids and the expansion of the gases therein due to commingling of the products of combustion in expanding to atmospheric pressure.

Venturi pressure, as a function of the air flow through the venturi 134, is transmitted to the fuel metering valves 140 from the apex of the venturi 134 by means of port 173' formed therein and in communication with the Venturi tubing 173. This Venturi pressure cooperates with static air pressure and fuel pressures to operate the fuel metering valves, as described in more detail in Fig. 13, to effect proportioning of the fuel to form a combustible mixture with the air flowing into the fuel-air chamber and the combustion chamber.

It is observed in passing, the construction illustrated has contemplated the expansion of materials under working temperature conditions.

A form of construction embodying three concentric strings of tubing, securing the power unit referred to as the power unit 7, in Fig. 1, or as the bottom hole power unit, in the well bore containing the well casing 1, tubings 2, 3, and 4, is illustrated in Figs. 9 and 10.

The same character references previously employed for the respective strings of tubing in the well bore are repeated herein, and the same character reference for the ignition cable 5 and the well casing 1, as illustrated in Fig. 1, are repeated again. Specific reference herein is also made to Figs. 4 and 5.

For the purpose of achieving rapid familiarization with the invention, the construction of the apparatus as illustrated in Figs. 9 and 10 is described as follows:

The flange 212 shown in Fig. 9 is secured to the tubing 2 and carries tubing housing carrier 210, secured thereto as by means of stud bolts 775 threaded into the body of the tubing housing carrier 210 at intervals around the periphery thereof.

The tubing housing carrier 210 is secured to power unit casing 192 as by means of an external extrusion on said power unit casing in the form of a flange formed as an integral part thereof. The power unit casing 192 carries swage nipple 191 at its lower extremity and the tubing 8 is secured thereto as by threads. Tubing 8 forms means of communication with well fluids in the well bore and the power unit, as previously mentioned.

The tubing housing carrier 210 carries concentrically therein and formed, as an integral part thereof, a spider into which pressure connection 215 effects the seal 115 therewith due to the weight of the tubing 3. Where the weight of the tubing 3 is insufficient to effect the seal 115, the tubing can be secured to the tubing housing carrier 210 as by threads. At the hub of the spider in the tubing housing carrier 210, a cone seat 122 is formed and provides means to seat pressure connection 211 therein. The pressure connection 211 is secured to the tubing 4 as by threads, a seal with the tubing housing carrier 210 being effected by the weight of the tubing 4 on the cone seat 122. Where the weight of the tubing 4 is insufficient to form effectively the described seal with tubing housing carrier 210, the tubing 4 can be secured to the tubing housing carrier 210 as by means of threads.

The hub of the spider in the tubing housing carrier 210 has fluid apertures 209 which communicate with the annulus 206, formed by the power unit casing 192 containing concentrically fitted therein the fluid separator tube 226 secured to the tubing housing carrier 210. The tube 226 is further secured by flat screws 242 threaded through the power unit casing 192, securing the spider 241 therein and to which the lower extremity of velocity tube assembly 201 is secured as by welding thereto. The fluid separator tube 226 is also secured to velocity tube 228.

The apertures 209 also communicate with the interior of the tubing 4 through the open end of the pressure connection 211.

The annulus 214 is formed by the internal upper extremity of the hub of the spider described in the tubing housing carrier 210 and the outer internal walls thereof, and communicates with passages 220 formed in the body of the tubing housing carrier and, also, with the annulus formed by the tubings 2 and 3. The passages 220 converge at the throttle mechanism 150. The throttle mechanism 150 is concentrically secured to the lower extremity of the center section of the tubing housing carrier 210.

Chamber 220' is formed by the interior walls of the fluid separator tube 226, and communicates with the passages 220, as by their convergence thereinto.

The chamber 231 is formed in the tubing carrier 210, and carries the port 232 through the inner wall thereof effecting communication between the chamber 231 and the annulus formed by the tubings 3 and 4. Said chamber 231 contains also port 162 communicating with the chamber 163 in the throttle mechanism 150. The air passage 149 formed in the tubing carrier 210 also communicates with the throttle mechanism 150.

Tubing 229 communicates with the chamber 231 and is secured to the lower wall of the chamber as by welding thereto. Tubing 229 also communicates with the fuel metering valve 230 secured to the Venturi body 221. Tubing 233 is secured to the fuel metering valve 230 and provides communication with the annulus 234 and the jets 222 formed as a part of the structure of the Venturi body. The tubing 233 at its lower extremity is secured to the Venturi body. The jets 222 communicate with combustion chamber 223.

Similarly, tubing 216 is secured to the fuel metering valve 230 and provides communication therewith, and the annulus 249 having jets 224, in communication therewith. The tubing 216 is secured to jet carrier 225 as by welding. Jets 224 communicate with the combustion chamber 223.

Port 236 formed at the apex of the Venturi body 221 communicates with tube 235 secured to the walls of the port in the Venturi body 221 and communicates with the metering valve 230.

The Venturi body 221 is secured to cylindrical tube 227 which is concentrically secured in the fluid separator tube 226. The tube 227 forms a segment of the walls of the combustion chamber 223 and has electrodes 237 secured therein as by threads through the walls thereof. This tube 227 is welded to the jet carrier 225 which bears the jets 224, formed therein, and which communicate with the combustion chamber 223.

Velocity tube 228 is secured to jet carrier 225 and to the fluid separator tube 226 as by welding.

The velocity tube assembly 201 can be described as follows:

Ports 257 shown in Fig. 10, in the base of the velocity tube 228 provide communication between the interior of the velocity tube and the annulus 206' and effect a means for the rapid equalization of pressures produced by displacement of valve head 238, which slidably fits within the velocity tube 228, by a combination of forces including the static pressure existing in the annulus 206'. The base of the velocity tube 228 is secured to the spider 241, concentrically fitted into the power unit casing 192, the legs of the spider resting on the interior walls thereof and secured thereto as by the flat screw 242, previously mentioned.

Piston ring 258 is mounted in a conventional manner in a groove in the outer wall of the valve head 238, and provides a slidable seal with the inner wall of the velocity tube 228.

The piston 255 is slidably fit into the lower extremity of the valve head 238 and normally urged downwardly by the spring 254 within the valve head 238.

Ports 256 of small diameter are arranged in the lower extremity of the velocity tube 228 and provide communication between the interior of the velocity tube and the annulus 206', formed by the concentric arrangement of the velocity tube and the power unit casing 192 when the valve head 238 moves downwardly by a combination of forces to which reference will be further made. Valve stop screws 238' are secured in the wall of said velocity tube and limits upward movement of the valve head 238 therein. Valve head 238 is urged against said valve stop by the springs 240 and 254.

Sleeve 253 fits slidably, but non-rotatably within velocity tube 228 and is retained therein by stops 239, secured to the velocity tube as by welding, and by spring 259 held in compression by sleeve 250 secured in the velocity tube. Rotation of the sleeve 253 is precluded by means of a flat screw acting through the wall of the velocity tube 228 operating in a vertical keyway in the sleeve 253.

Sleeve 253 has the orifice plate 252 and venturi 251 secured therein as by welding. Ports 260 are formed in the venturi 251 and the sleeve 253. Ports 260' in the sleeve 253 can be aligned with the ports 256' in the velocity tube 228, as will become apparent.

A series of ports 256' are provided in the velocity tube 228 with which the ports 260 communicate when the spring 259 is compressed by forces subsequently described.

The sleeve 250 carries the hot plug 248 secured concentrically thereto by arms 249. The power unit combustion chamber is formed by the interior walls of the upper extremity of the velocity tube 228, the interior walls of the jet carrier 225, and the interior walls of the cylindrical tube 227.

The push rod 205 is secured to the piston 255 and extends downwardly through spring 240 which is held in compression between the piston and the hub of the spider 241 through which the push rod slidably fits. The lower extremity of the push rod carries the saddle 205'. The function of the saddle is to preclude marring of the surface of valve ball 198 by the operation of push rod 205.

The valve seat carrier 207 is concentrically secured in power unit casing 192 as by flat screws 208 in the walls thereof, and bears valve ring 200 secured concentrically therein. The valve ring 200 has passage 199 therethrough.

The spider 194 is concentrically secured to the interior walls of the power unit casing 192 as by flat screws 195 threaded thereinto, and carries at its hub and concentric therewith a thrust rod 197 slidably fit therein and holds in compression the spring 196 positioned within a counterbore in the spider hub. The thrust rod carries the saddle 197' which presses upon the valve ball 198 under the influence of the spring 196 and whereby the ball tends to remain seated in the valve ring 200. The spider 194 carries its upper extremity, legs formed as an integral part thereof which rest along the interior walls of the power unit casing and the lower extremity of the valve seat carrier 207, thus forming a cage for the valve ball 198.

Chamber 190 is formed by the interior walls of swage nipple 191 and communicates with the interior of the tubing 8 and with chamber 193 formed by the interior walls of the lower extremity of the power unit casing 192 containing therein the spider 194 and the valve ball 198. Chamber 190 also communicates with the chamber 206″ by the passage 199 at such times as the valve ball is displaced from its seat in valve ring 200.

A chamber 206″ is formed at the lower extremity of the annulus 206′, in power unit casing 192, and communicates through the legs of the spider 241 with the annulus 206′. Annulus 206′ is an elongation of the annulus 206.

The ignition cable 5 is electrically connected to the electrodes 237 to provide means for an electric arc or spark to be formed in the combustion chamber 223 to ignite an inflammable mixture formed therein. Ignition cable 5 is, of course, connected in a convenient manner to the switch 10, Fig. 1, and thence to a suitable source of electric power. It is also connected to the electrodes in the combustion chamber in the power unit 6, previously described.

Packing gland 246, secured in the flange connection 212 as by threads therein, provides means to convey the ignition cable 5 from the exterior of the power unit to the interior thereof and to preclude the flow of fluids around or through that portion of the ignition cable 5 in the packing gland 246, and to permit electrical energy to flow through said ignition cable.

It is here noted that the portion of the ignition cable 5 in the power unit pursues the route of the air stream in the unit. The operation of the power unit 7 is as follows:

Air is conducted into the power unit through the annulus formed by the tubings 2 and 3 by means illustrated in Fig. 1, and flows through the annulus 214, passages 220 and into the chamber 220′. A part of the air moves around the outer wall of the venturi 221 and the outer walls of the combustion chamber 223 and is circulated thereby by means of temperature changes effected by combustion of an inflammable fuel-air mixture in the combustion chamber 223. It then flows through the venturi 221, thus tending to equalize the temperature gradient of the combustion chamber walls and preheat a portion of the air induced through Venturi body 221. In connection with the above, reference is further made to Fig. 42, relative to further utilization of the air stream.

In starting the power unit, normally the air is forced through the venturi 221 over port 236, and over the throttle mechanism 150, thence over the jets 222 which spray fuel thereinto in suitable inflammable proportions therewith, to form a combustible mixture which is ignited initially at the electrodes 237 by means of an electrical arc formed therein. Throttle mechanism 150 and jets 224 provide additional fuel as required to facilitate combustion in the combustion chamber 223.

In connection with the above, and in "idling" of the power unit, the velocity tube assembly 201 permits restricted operation of the power unit prior to its assuming its fluid load in the power unit system, as will be apparent.

Fuel is supplied to the power unit as by gravity flow, or otherwise, through the annulus formed by the tubings 3 and 4 and moves by gravity or under pressure through the port 232 and thence into the chamber 231. A part of the fuel moves through the port 162, and thence through the throttle mechanism 150 and into the air stream flowing through the Venturi body 221.

A part of the fuel also moves through the tubing 229 and into the fuel metering valve 230. The operation of the fuel metering valve 230 is subsequently described in connection with Fig. 13. Fuel is metered by the metering valve 230 at a suitable rate to provide proper proportioning with the air flowing through the Venturi body 221. It then flows into the tubing 233, and the annulus 234, whence it moves through the jets 222 and is sprayed into the air stream flowing through the venturi 221 into the combustion chamber 223.

The remainder of the fuel metered by the fuel metering valve 230 moves through the tubing 216 to the annulus 247 and thence through jets 224 spraying into the combustion chamber 223.

The fuel flows above described are of a continuous nature when the power unit is in operation, the quantity of fuel consumed by the power unit, a function of the air flow, is also of a continuous nature.

Hence a continuous combustible mixture continues to be formed in the combustion chamber 223, to propagate a flame therein of the nature of the flame of a torch. The products of combustion flow over the hot plug 248 to insure continuous ignition of the combustible mixture in the combustion chamber, as by heat energy radiated thereby, subsequent to discontinuance of the electric arc formed at the electrodes 237 in the combustion chamber 223.

The products of combustion, due to their expansion in a restricted area, the combustion chamber 223, as the result of the ignition of the combustible mixture therein, flow downwardly through the velocity tube 228, in the manner of gases moving from a high pressure area to a lower pressure area. Such flow continues through the venturi 251, the sleeve 253, the orifice plate 252, and thence through the velocity tube 228 where they impinge upon the valve head 238.

The ports 256 in the velocity tube 228 provide means for rapid egress of fluids within the velocity tube as the valve head 238 moves downwardly by forces engendered by the products of combustion impinging on the upper surface of the valve head. Energy available in the products of combustion is continuously formed in quantities of sufficient potential to overcome resistance afforded by the static pressure of the springs 254 and 240 and also to overcome any resistance to flow of fluids upwardly about the velocity tube 228. In thrusting the valve head 238 downward through the velocity tube 228, the ports are uncovered and permit the gases of combustion to flow into the annulus 206′.

When the power unit is not in operation the function of the spring 240, augmented by the action of spring 254, previously described, is to urge the valve head 238 against the valve head stop 238′ in the velocity tube 228, above the lower series of ports 256 therein, precluding movement of fluids from the annulus 206′ into the velocity tube.

With the power unit in operation, as above described, the amount of travel of the valve head 238 downwardly is determined by the relative forces acting on the valve head. The forces impinging on the upper surface thereof are of sufficient potential to compress the spring 254 against the upper surface of piston 255, and to compress spring 240, and hence to thrust the push rod 205 against the valve ball 198. Hence, as the forces acting through the velocity tube 228 are increased, as by the addition of greater quantities of fuel and air forming additional quantities of the combustible mixture, additional forces in the products of combustion continue to move the valve head 238 downwardly hence thrusting the push rod 205 downwardly, displacing the valve ball 198 from its seat in the valve seat 200. Thus effective opening of the passage 199 in the valve seat 200 is accomplished to permit flow of fluids therethrough.

With the power unit in operation, well fluids enter the chamber 190 through the tubing 8, due initially to the hydrostatic head of the fluid, and subsequently to the action of the products of combustion in the annulus 206'. Said hydrostatic head of fluid initially moves the well fluids from the chamber 190, thence into the chamber 193, and through the port 199 into the chamber 206'' and thence into the annulus 206'.

The products of combustion and well fluids in the annulus 206' move, from expansion of gases from a high pressure and high temperature area to an area of comparatively lower pressure and comparatively lower temperature, from the annulus 206' through the annulus 206, and the apertures 209, and thence into the interior of the tubing 4 which can communicate with atmospheric pressure and atmospheric temperature.

Displacement of the fluids from the annulus 206' as a result of the sum of the energies available in the fluids therein, permits such a process to be of a continuous nature during the period of operation of said power unit in the well bore.

Flow of the products of combustion through ports 256 adjacent the valve head 238 permits a resultant force to act on the products of combustion contained in the velocity tube 228. In expanding the products of combustion through the orifice plate 252, the sleeve 253 is thrust upward compressing the spring 259 and aligning ports 260 with the ports 256.

A high velocity flow of fluids through the venturi 251 as compared to the velocity of fluids in annulus 206' results in a low pressure area to be formed within the throat of the venturi 251 as compared to the fluid pressure in chamber 206'. This results in a flow of fluids, as from a comparatively high pressure area to a low pressure area, to provide a regurgitating action and thus to further heat and aerate fluids in annulus 206'. Ports 260', as a result of such action, are aligned with the ports 256', and comparable fluid flows established therethrough and effecting an additional fluid cycle in the velocity tube 228, to augment the aeration of fluids in annulus 206'.

The construction illustrated in Figs. 9 and 10, and as above described, is peculiarly adapted for the cleaning out of the well bore by the energy made available by the power unit near the bottom of the well bore. It is to be observed that this construction provides for ease in omitting the velocity tube assembly 201 and the blocking of the annulus 206, where considerable power is required in a limited area.

It is to be further noted that expansion of the products of combustion formed as described in the power units, can be increased by expansion into atmospheric pressure.

In Fig. 13, the apparatus illustrated comprises one form of a fuel metering valve, previously referred to as the fuel metering valve 140 and 230, and will subsequently be referred to as the fuel metering valve 433 and 526, since different character references are employed due to the external configuration of the fuel metering valve. In each instance, however, the apparatus will be designated as a fuel metering valve or a metering valve.

The fuel metering valve comprises the body 280 having the aperture 265 therein to which a tube or tubing or other suitable fluid conductor can be secured to provide communication therewith from a suitable source of fuel such as illustrated in Figs. 4 and 5 by the fuel line 135 and the fuel line 135' and further illustrated in Fig. 9 as by tubing 229 and subsequently illustrated by fuel line 432, or the like, an adjacent chamber and such other means as hereinafter disclosed.

The port 275 provides communication with the interior of the cylinder 261 and with a suitable source of air pressure preferably the port 173' (Fig. 5) or port 236 (Fig. 9) at the apex of a Venturi body. Venturi tubing 173, as illustrated in Figs. 4 and 5, and tube 235, as illustrated in Fig. 9, and other means hereinafter illustrated provide examples of means above described.

Fuel inlet 265 suitably formed in the valve body communicates with passage 267 therein and in turn with the chamber 266, also suitably formed in the body 280.

A hollow piston 269 is axially, but nonrotatably movable within a bore 271' in the body and has opposed side openings 270 and 270''' which are movable into mating relation with ports 270' and 270'' in the body whereby chamber 266, annulus 268, and the interior of the piston are interconnected. Jets 279 in turn communicate with the annulus 268.

Piston rings 272 on the piston 269 form a seal with the walls of the bore 271'. This enables the piston to respond to temperatures existing when the device is in operation without affecting the sensitivity in response of the piston from pressure applied through the port 271 between the inlet 265 and the upper end of the bore 271'.

A port 274 formed in the body 280 provides communication to the exterior of the body from the bore 271'. Cylinder 261 is secured in the lower end of the bore 271' and carries the piston 262 therein bearing upwardly extending plunger 263. Plug 278 bears the port 275 formed therein previously described. The plug 278, which provides port 275 closes the lower end of the cylinder 261 and the piston 262 thereabove is held in a predetermined position by springs 276 and 277 on opposite sides thereof. Another spring 273 rests upon shoulder 261' in the bore 271' and exerts a force urging the piston 269 upwardly within the bore.

When the apparatus is in operation, fuel pressure exerted through the port 271 forces the piston 269 downwardly while air pressure exerted through port 274 in the body similarly acts to force the piston 262 downwardly. In this manner a passage is provided for fuel from inlet 265 through ports 270', 270, 270''', and 270'' to annulus 268 whereby such fuel is supplied to the jets 279. The position of piston is, of course, contingent upon the difference between the air pressure supplied to port 271 and the pressure supplied to the port 275 from the venturi within the power unit. It seems apparent therefore, that the rate at which fuel is supplied to the jets is correlated with the fuel, air, and venturi pressures as just indicated.

As air flow is increased, the air pressure at the port 275 is decreased due to Venturi action and hence the plunger 263 tends to move downward as a result of pressure forces acting on the piston 262, thus providing less resistance for fuel flow through the piston 269. Hence, more fuel is admitted to the jets in proportion to the increased air flow, assuming the fuel pressure remains constant. Where fuel pressure is increased or decreased there is a compensating movement of the piston 269 as compared to the plunger 263 to provide requisite effective areas in the ports 270 and 270''' for the fuel flow, thus providing constantly inflammable fuel-air mixtures in the combustion chamber, further described as follows:

When air flow is decreased and the pressures at ports 274 and 275 tend to equalize, plunger 263 moves upwardly urged by the spring 276, to decrease fuel flow as by tending to obstruct the ports 270 and 270'''. When air flow stops, the piston spring 276 and spring 277 are so calibrated that the piston spring 276 slightly overpowers spring 277, and fuel flow also stops as air pressures at port 275 and port 274 become equal and the plunger 263 thus can effectively seal the ports 270 and 270'''. A recession, or reduced end section 264 on the plunger 263 permits wire drawing of fuel flow to maintain pilot light operation in the combustion chamber. The fuel metering valve just described increases the utility of the apparatus under field conditions, as correct fuel and air flows are accurately coordinated thereby.

A modified form of apparatus for metering fuel is illustrated in Figs. 14 and 15, these two subassemblies normally functioning as a unit and hence are referred to as a fuel metering valve. In Figs. 54 and 55, the character reference 703 is given the apparatus illustrated in Fig. 14, and the character reference 703' is given the apparatus illustrated in Fig. 15.

Referring to Fig. 14, the metering tube 281 carries at its upper extremity cap 282 which has the port 283 formed therethrough. Springs 284 and 293 are positioned within the upper and lower ends of the tube 281 and bear against pistons 285 and 291 respectively. Each of these pistons is provided with suitable rings to form a seal with the tube 281 and the two pistons are interconnected by a metering rod 287 extending through orifice 288 having valve seats at its opposite ends for cooperation with complementary valve surfaces on the respective pistons 285 and 291.

Connections 294 and 296 communicate with the interior of the metering tube 281 at points below the pistons 285 and 291 respectively. A separate connection 295 also enters the metering tube at a point below the orifice 288 but above the piston 291.

In operation, of this form of metering valve, the port 283 is subjected to static air pressure; whereas the passage in connections 294 and 296 are subjected to fuel pressure. The passage in connection 294 communicates with the fuel tubing 295, through the orifice 288 in the valve seat 289.

Fuel enters port 294 and flows into the tube 281 and through the orifice 288, and flows thence into fuel tubing 295.

Piston 285 is subjected to static air pressure on its upper surface acting through the port 283 and the piston 291 is subjected to static fuel pressure on its lower surface which acts through the connection 296. Spring 284 is calibrated to overpower spring 293, and thence fuel pressure regulation is provided by means of spring 284, and static air pressure, which tend to urge the piston 285 into a valve seat 289, as fuel pressure exceeds air pressure.

Variations in intensity of the static air pressure and the static fuel pressure effect compensating movement of the metering rod 287, thus regulating the fuel supply to the fuel tubing 295, as a function of the forces described.

It is intended that the structure 703', shown in Fig. 15, shall be used in conjunction with that of Fig. 14, the two being interconnected through the common connectors 295. This structure comprises a housing 297 having a tube 298 at its upper end which communicates with an orifice at the apex of a venturi in a combustion chamber entrance. The valve housing 297 carries the calibrated spring 299 therein, and the interconnected pistons 300 and 300'. The rod 340 interconnects these pistons in spaced relation. The calibrated springs 299 and 299' engage the pistons 300 and 300' and tend to hold this piston assembly in a predetermined position within the housing 297.

The lower surface of piston 300 thus communicates through the open end of valve housing 297 with the same relative static air pressure as port 283, which communicates with the upper surface of piston 285 (Fig. 14). The upper surface of piston 300' communicates with Venturi air pressure, to which previous reference has been made.

The valve port 341, formed in housing 297, communicates with fuel supply tubing 295 to which it is secured. Port 342, formed in housing 297 is connected to communicate with any jet fuel supply annulus with which the fuel metering device is to be used. Further, port 341 is opposite port 342 in the cylindrical bore bearing the pistons 300 and 300'. Thus, the fuel supply is in communication with the jet fuel supply annulus when said apparatus is in operation which can be described as follows:

The fuel metering valve comprises assemblies 703 and 703' which cooperate to meter fuel in such proportions as to provide an inflammable mixture in a combustion chamber contained in a power unit.

As the calibrated spring 299 slightly overpowers the calibrated spring 299', the difference in pressure components as described, acting on the surfaces of pistons 300' and 300, moves the piston 300 upwardly as the air flow is admitted into the combustion chamber, thus uncovering the ports 341 and 342 and permitting fuel to transverse the route previously described. Variations in air pressure components induces compensating variations in the relative positions of the pistons to the ports. Hence, a metering action of fuel occurs as a function of the air flow into the combustion chamber.

On equalization of the pressure components as where air flow stops, ports 341 and 342 are obstructed by piston 300', stopping fuel flow into a combustion chamber not in use. High rates of air flow induce also a compensating action in the apparatus as piston 300 will tend to close ports 341 and 342, as by action of pressure components above described. Intermediate air flows provide compensating metering of the fuel as a function of the pressure components.

Figure 16:
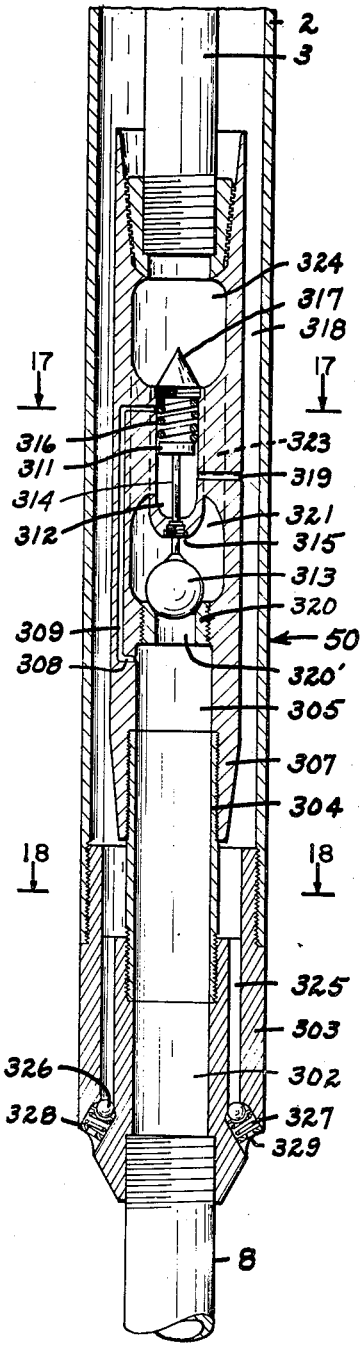
Fig. 16 is a vertical sectional view of the bottom hole valve comprising an adjunct to the apparatus of the invention.
Figure 17:
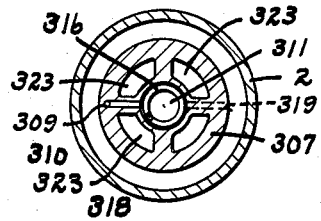
Fig. 17 is a section across the valve carrier body on the line 17—17 of Fig. 16.
Figure 18:
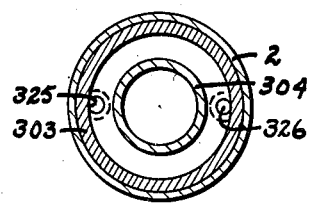
Fig. 18 is a sectional view across the foot piece body on the line 18—18 of Fig. 16.

The apparatus illustrated in Fig. 16, with sectional views of the same apparatus illustrated in Figs. 17 and 18, has been referred to as bottom hole valve 50, and is illustrated secured in the well bore, in Fig. 2.

The apparatus is secured in the well bore as by threads, to tubings 2, 3, and 8, and forms means of communication between tubing 3 and tubing 8, and also provides means to regulate fluid flows therethrough in proportion to fluid pressures exerted by a column of fluid, such as air, induced into the annulus formed by the tubings 2 and 3, which can communicate with the fluids in the well bore as hereinafter disclosed.

The character of construction of the apparatus lends itself to wide spread application where one fluid flow is regulated as a function of pressure components in a second fluid column; such as that required in a pressure reducing valve, and in other circumstances, as will become apparent from the following description.

Well fluids, due to their hydrostatic head, enter the apparatus through tubing 8, secured to foot piece 303 and move thence into chamber 302 formed therein.

The chamber 302 communicates with chamber 305, formed in the valve carrier 307, by means of tubing 304 concentrically secured to the foot piece 303 and also concentrically secured to the valve carrier 307. Hence, well fluids move, as by forces described, into the chamber 305, from the chamber 302 through the tubing 304.

The foot piece 303 is concentrically secured to tubing 2, hence the valve carrier 307, concentrically secured to tubing 3, forms the annulus 318 which is in effect an extension of the annulus formed by the tubings 2 and 3 and communicates with passages 325 formed in the foot piece 303.

The passage 309 formed in the valve carrier 307 communicates with chamber 305 by means of port 308, formed in valve carrier 307, and with the upper end of cylinder 312, formed concentrically in the valve carrier 307. Cylinder 312 contains the slidably fitted piston 311. This piston 311 is retained in the cylinder 312 by the cylinder cap 317, secured as by threads to the valve carrier 307 and by the spring 316, fitted into the upper extremity of the cylinder 312.

The piston 311 carries on its lower extremity the piston rod 314, secured thereto as by threads, slidably fit through the packing gland 315 secured concentrically to valve carrier 307. Piston rod 314 is urged against valve ball 313, resting in the valve seat body 320, by the spring 316 held in compression thereabove.

The passage 309 communicates with the upper surface of piston 311, whereas passage 319 formed in the valve carrier 307, provides means of communication between the lower surface of piston 311 and the annulus 318.

The area of the upper surface and the area of the lower surface of the piston 311 are equal, and are equal to the area of port 320' formed in the valve seat 320 into which the valve ball 313 rests, as above described.

Port 320' affords means of communication between the chamber 305 and the chamber 321, formed in the valve carrier 307, on displacement of the valve ball 313 resting therein, by forces subsequently described and acting on the valve ball 313 and the lower surface of the piston 311.

Passages 323 formed in the valve carrier 307 afford means of communication between chamber 321 and chamber 324 formed in the valve carrier 307.

Passages 325 in the foot piece 303 afford means of communication between the annulus 318 and well fluids in the well bore. Each of said passages 325 contain therein a valve ball 326 urged into a seat formed in the passage 325 by compression spring 327 slidably fitted therein and retained in compression with the valve ball 326 by means of spring cap 328, secured to the foot piece 303. Spring cap 328 carries port 329 formed therein, and effects communication between the passage 325 and the well fluids on displacement of the valve ball 326 from its seat by means of fluid pressures thereon exceeding those of the well fluid pressures.

Hence, by increasing the fluid pressures in the passages 325, which are in communication with the annulus 318, as by means of pump pressure to exceed pressures exerted by the well fluids in the well bore and by spring 327, the valve ball can be displaced from its seat in the passage 325 and condensate or other fluids ejected from the annulus 318. This action provides means of obviating fouling of the passage 319 and permits resetting of the displacement of the valve ball 313 relative to port 320' where a liquid is utilized as a pressure medium in the annulus 318 to effect flows of fluids between the chamber 305 and the chamber 321.

Well fluids in the chamber 305 exert a fluid pressure on the upper surface of piston 311 through port 308 and passage 309, which is augmented by compression of spring 316 thereon, thus tending to effect an equalization of pressure components acting on valve ball 313 resting in port 320'. The lower surface of valve ball 313 is exposed to fluid pressure in chamber 305.

Hence, fluid pressures exerted on the lower face of the piston 311, by means of fluid pressure acting through passage 319, will tend to move the piston against compression of the spring 316, and displace piston rod 314 from contact with valve ball 313. Thus, the condition of equalization of pressures above and below the valve ball 313 no longer exists if tubing 3 is exposed to a lower pressure such as atmospheric pressure while the well fluids in the chamber 305 are exposed to formation fluid pressures of the well fluids in the well bore.

Hence, piston rod 314 is displaced vertically a distance determined by the difference in the upper and the lower pressures exerted on the lower faces of piston 311. Thus, valve ball 313 will be displaced from its seat in port 320' by exertion of the pressure of the well fluids thereon in the chamber 305.

While the above description indicates that the valve ball 313 may rise independently under fluid pressure, it seems apparent that the ball valve may be attached to the lower end of the piston rod 314 whereby it will move positively relative to the valve seat body as the piston 311 moves in response to fluid pressures acting thereon.

In operation of the bottom hole valve just described, and comprising an element of the invention, well fluids flow, as by hydrostatic pressure and formation pressures, from chamber 305 thence through port 320' and into chamber 321 in communication therewith as above described. They then flow from chamber 321 through passages 323 into the chamber 324. As chamber 324 communicates with tubing 3, well fluids are thus permitted access to the tubing 3, which is in communication with the power unit in the well bore as previously described.

Thus, a regulation of flow of fluids into tubing 3 from tubing 8 can be effected by means of suitable fluid pressures exerted on and by fluids contained in the annulus 318. A means of providing communication from the annulus to the well fluids in the well bore is thus provided also by the apparatus.

Figs. 19 and 20 are longitudinal continuations of an alternate form of the invention. The apparatus has been referred to as a power unit 23, in Fig. 2, and is interchangeable with power unit 25 as illustrated in Figs. 54 and 55 hereinafter described. Choice of the power units for a particular well bore is contingent upon character of fluids on which work is performed and the desires of the operator in achieving selected objectives of the invention.

Referring to the apparatus illustrated in Figs. 19 and 20, hereinafter referred to as a power unit 23, the passage 420 is formed in tubing carrier 422, and communicates with the annulus 318 formed by tubings 2 and 3. The tubing 2 and the tubing carrier 422 are interconnected in a suitable manner as shown. The pressure connector 424 is secured to tubing 3 and bears on an inner extension of tubing carrier 422 due to the weight of tubing 3 thereon, thus effecting a seal therewith. Tubing 3 is secured as by means of threads to tubing carrier 422, where the weight of tubing 3 is insufficient to effect the above described seal.

Passage 420 communicates with the ports 426 formed in the body of tubing carrier 422 by way of one or more apertures 423.

The tubing carrier 422 is secured to the power unit casing 451 therebelow and in turn to the mixing chamber housing 409 to which the lower tubing carrier 407 is attached. The lower section of tubing is connected thereto and extends downwardly.

The lower string of tubing 3 is secured to tubing sleeve 400 which has a spring 405 slidably fit thereon and held in compression therewith by an outer concentric sleeve 401, which bears upon a lower surface of the spider 402. The legs of spider 402 rest on interior walls of the lower tubing carrier 407 and the upper extremity thereof is secured, as by welding, to the mixing chamber housing 409. Valve 441 fits slidably within the hub of the spider 402 and carries a reversing cone 442 slidably fitted thereon and urged against the head of valve 441 by the compression spring 446. The head of valve 441 is urged into the port 440 in mixing chamber by the action of the spring 446 bearing in compression on reversing cone 442. Axial port 440 is formed in mixing chamber 409 and communicates with a velocity tube 439 through flame arrestor 448, concentrically secured in the mixing chamber. This flame arrestor 448 comprises numerous cylindrical ports formed longitudinally therethrough and thus maintains communication between the velocity tube 439 and the port 440.

The velocity tube 439 has secured thereto the lower jet carrier 430' as by welding. This jet carrier 430' bears jet housing 429' having jet apertures 436' formed therein communicating with the combustion chamber 430. The lower jet carrier 430' is secured to tube 460 as by welding. This tube 460 carries a spider 477 formed on its lower extremity to preclude lateral motion of the tube, the legs of the spider resting on the interior walls of separator tube 452. Separator tube 452 is secured as by press fitting to mixing chamber housing 409 at its lower extremity and to tubing carrier 422 at its upper extremity, concentric within the power unit casing 451.

The interior walls of tube 460 form the combustion chamber 430 into which the lower extremity of the electrodes 431 protrude. These electrodes are secured, as by threads, in an interior extrusion of the walls of tube 460. The tube 460 carries fuel metering valve 433, such as that previously described in connection with Fig. 13 and the Venturi body 428 at the upper extremity thereof.

Venturi body 428 has fuel jet bodies 429 formed therein and having jet apertures 436 communicating with the combustion chamber 430. Port 438 communicates with pressure tube 437 which in turn communicates with fuel metering valve 433.

Fuel is supplied the power unit as shown in Fig. 2, from the annulus formed by the well casing 1 and tubing 2, through the tubing 432 passing through the outer wall of tubing carrier 422. Fuel tubing 432 thus conducts fuel to the fuel metering valve 433. Tubing 434 provides communication between the fuel metering valve 433 and the annulus 435 formed in Venturi body 428 which communicates with jet apertures 436. The tubing 432' extends downwardly and provides communication with the combustion chamber 430 at its lower end.

Throttle mechanism 150 (shown in enlarged view in Fig. 23) is secured to the lower extremity of the tubing carrier 422 and communicates with fuel tubing 432 by fuel passage 162 bearing Y connection 162' therein. This Y connection is in turn secured to tubing 432.

Ignition cable 5' is connected to electrodes 431 and bears the tap 476 thereon to convey electrical power for ignition to electrodes in additional combustion chambers therebelow in the well bore. A section of the ignition cable 5' can be secured to a suitable thimble 473 in a spider 474, secured in the tubing carrier 422. The cable thence passes through packing gland 475 in the upper tubing carrier 422, or may pass directly through the outer wall of tubing carrier 422 as desired. Where the upper section of said ignition cable 5 is removable from the well bore, attention is directed to means of providing an electrical switch in the well bore, as illustrated in Fig. 60, or as by means of cooperative thimbles therein. The upper extremity of the ignition cable 5 is secured to a suitable source of electrical energy as at switch 10.

When the power unit of Figs. 19 and 20 is in operation, fuel is supplied to the combustion chamber 430 as by means of gravity flow or pump pressure from the annulus formed by well casing 1 and tubing 2, through fuel tubing 432 in communication therewith to the fuel metering valve 433. Fuel is metered thence from fuel metering valve 433 as previously described, and flows by forces above described through tubing 434 to the annulus 435 and thence through jet apertures 436 and into the air stream flowing through Venturi body 428. A part of the fuel is metered by the fuel metering valve 433 into tubing 432' and thence into annulus 435' and through jet aperture 436' and sprayed into the interior of the combustion chamber 430, to augment combustion therein.

Air flows, as by means of pressure thereon, into the combustion chamber of the power unit by way of the annulus formed by tubing 2 and tubing 3, the air passages 318 and 420, ports 423 and 426, a part of the air flowing thence over throttle mechanism 150 and through the Venturi body 428, having port 438 therein, thence over fuel jets 436, receiving fuel therefrom which is mixed therewith as by means of the counterflows of air and fuel to form an inflammable mixture in the combustion chamber 430. The inflammable mixture is ignited at the electrodes 431 in combustion chamber 430.

The function of the port 438 in the Venturi body 428 is to provide an air pressure for the fuel metering valve 433, as illustrated in Fig. 13 as already explained. An optional form of fuel metering valve is illustrated in Figs. 14 and 15, and can be employed in lieu of the fuel metering valve described in connection with Fig. 13.

As it is desired to combine the oxygen in the air flowing into the combustion chamber 430 with the fuel flowing therein, throttle mechanism 150 cooperates with the fuel jets to supply additional quantities of fuel into the inflamed mixture. Products of combustion move; as by gases expanding from a high pressure area to that of an area of lower pressure, through the velocity tube 439 in communication with the combustion chamber 430, and thence through the flame arrestor 448, and through the port 440 in communication therewith. The energy contained in the products of combustion, dislodges the valve 441 resting in its seat in port 440, compresses spring 446, and impinges on the upper surface of reversing cone 442.

At this point in the operation of the power unit, port 440 is in communication with ports 443, formed in the mixing chamber housing 409. When the power unit is not in operation the function of spring 446 is to insure closure of port 440 by the valve 441 precluding the flow of fluids upwardly, through the route described, into combustion chamber 430, by tending to urge the reversing cone 442 against the lower extremity of the valve head on the valve 441.

Well fluids enter the lower section of tubing 3, as by their hydrostatic head or as by the action of a power unit thereon, and move through sleeve 400, spider 402, and thence into mixing chamber 403, formed by spider 402 and the lower extremity of mixing chamber housing 409, in communication therewith.

Where the products of combustion flow over the reversing cone 442, as described above, the reversing cone is contained in the mixing chamber 403; a commingling of the well fluids with the products of combustion occurs therein, resulting in the aeration of the well fluids by the products of combustion. The resultant mixture, and the energy thus available, induced by the products of combustion flowing thereinto, flows the mixture through the ports 443 and into the annulus 444 formed by the concentric arrangement of the power unit casing 451 and the separator tube 452. The mixture flows thence through the ports 454 and into the chamber 427 at the lower end of the upper section of tubing 3.

That part of the air in the ports 426 which does not flow over the throttle mechanism 150, moves through the annulus 471 in communication therewith, formed by the concentric arrangement of the separator tube 452 and tube 460. The annulus 471 communicates with ports 412 formed in the mixing chamber housing 409, and the ports also communicate with annulus 410, formed by the concentric arrangement of the spider 402 and the lower tubing carrier 407, and communicating with the annulus formed by the lower tubings 2 and 3. Hence, through ports 412, thence through annulus 410, and through the annulus formed by tubings 2 and 3, to serve additional power units in the well bore and to do other useful work.

It is pointed out that with a small modification, blocking of ports 454, tubing 3 can be dispensed with and well fluids ejected into the annulus formed by the well casing 1 and the tubing 2, through apertures opened in the power unit casing 451, a desirable feature of construction for application where movement of well fluids through restricted areas preclude the utilization of more than one string of tubing. Also, the tubing carrier housing 422 can be modified so that the tubing 2 can be utilized as a fuel-air conductor for the power units. Such an arrangement is shown in Figs. 39, 40, and 46, to be later described.

Fig. 23 is an enlarged section of the throttle mechanism 150. The throttle carrier body 155 can be an integral part of any body carrying throttle mechanism 150; such as a tubing carrier, or a tubing housing carrier, or a jet housing carrier; or a spider, and is further herein illustrated. The function of the throttle mechanism 150 will now be made more fully apparent.

Throttle cylinder cap 148, secured to body 155, retains concentrically therein, the slidably fitted cylindrical throttle piston 151 which bears an external shoulder thereon, on which throttle piston spring 152 rests, slidably fitted around throttle piston 151, and retained thereon by an internal shoulder formed on throttle cylinder cap 148.

Similarly, throttle piston 151 slidably retains concentrically therein cylindrical throttle shank body 147 bearing thereon an external shoulder. The shank spring 146, slidably fitted around shank body 147, is retained thereon by an internal shoulder on the throttle piston 151.

The throttle head 161 is secured to throttle shank body 147 and an aperture 154 is formed concentrically through throttle shank body 147 and the throttle head 161. This aperture is expanded or conical on its inner extremity to form a seat for the fuel cone body 139. It is also expanded on its outer extremity to form means for the insertion of a cap plug when required.

The fuel cone body 139 is concentrically secured to the base of throttle piston 151, as by threads, and is provided with wrench fittings 138 to facilitate the securing of same thereto. The orifice 164 is concentrically formed in fuel cone body 139.

The key 183, secured to throttle piston 151 on its outer extremity is fitted into keyway 184, formed in body 155, and precludes lateral rotation of throttle piston 151 in body 155.

The needle valve assembly 182 is provided with the needle 137, concentrically and slidably contained in needle valve housing 136, by cooperative shoulders formed thereon, which is concentrically secured in the body 155 and permits alignment of the valve needle 137 with the opening or orifice 164 in fuel cone body 139 into which the valve needle 137 can slidably fit.

The interior of the needle valve housing 136 communicates with port 119 formed in the body 155. Movements of valve needle 137 in needle valve housing 136 are a function of fluid pressures transmitted thereto as modified by needle valve spring 118 acting thereon. The needle valve spring 118 is slidably contained in needle valve housing 136.

The chamber 163 formed in the body 155 communicates with aperture 154 through orifice 164, and can communicate with a suitable source of fuel by means of passage 162, formed in body 155. The aperture 154 can be connected to a suitable source of air supply by means of passage 149 formed in the body 155 and the passage 159, formed in throttle piston 151.

Passages 149 and 162 form means to provide the securing of a cap plug thereinto under certain conditions of operation of the throttle mechanism 150, to permit closure of said passages, as where the character of fuel employed by the power unit obviates the necessity for said passages above described.

In operation, the throttle mechanism receives fuel, as by gravity flow or the action of a pressure pump thereon which enters the fuel passage 162 and moves thence into fuel chamber 163. It is then permitted to flow through the orifice 164, when the valve needle 137 is displaced therefrom, by action of the throttle piston 151 and the throttle head 161 in the air stream intake to the power unit.

Air enters the throttle mechanism 150 through the passage 149 upon alignment of passage 156 with passage 149 and on displacement of throttle shank 147 relative to the fuel cone body 139. The alignment of the passages is contingent on compressibility of the spring 152 and the action of the throttle piston 151 in the air stream intake to the power unit as previously described, in cooperation with movement of the shank 147 and the valve head 161, in the air stream, and the compressibility of spring 146.

Commingling of fuel and air can occur in the aperture 154, on displacement of the fuel cone 139 relative to the needle valve 137, by the aforementioned movement of the throttle piston 151 into the air stream. Hence, the fuel-air mixture can flow through aperture 154 into a low pressure area formed, as previously described, at the apex of the throttle head 161, into which the fuel-air mixture can expand, thus providing for atomization of the fuel flowing thereinto.

The relationship between air pressure in air ports 149 and Venturi air pressure at throttle head 161, as compared to the counter forces exerted by throttle piston spring 152 and throttle spring 146 and the reaction of discharge of fluids through aperture 154, provides for a wide range of throttle movement.

Where volatile fuel or a gaseous fuel is employed in the power unit, passage 162 can be dispensed with and hence, where the necessity for mixing of fuel and air in the aperture 154 no longer exists, the needle valve mechanism 182 and the air ports 149 can be excluded from the construction of the throttle mechanism. Such an illustration appears in Fig. 25. The ports and apertures illustrated in the throttle mechanism 150 are diagrammatic only for this type construction.

Further description of the operation of the throttle mechanism 150 was previously disclosed in describing Figs. 4 and 5 to which reference is hereby made.

The structure and operation of the embodiment shown in Figs. 24 to 27 are similar to that shown in Figs. 19 to 22 and like reference characters are used for like parts. In the following consideration of this alternate embodiment reference is also made to Figs. 54 and 55, and to Fig. 2, relative to fluid flow in the well bore, and the objectives achieved by the device. It may also be noted that this modified construction is such that there is a reversal of flows in portions of the device as will be apparent from the following description of the operation of the device.

In the operation of the device shown in Figs. 24 to 27, fuel for the power unit enters through the annulus formed by well casing and the tubing 2, to and through the fuel line 432 whence it is metered by action of the fuel metering valves 433 and 433'; and introduced to the combustion chamber through the jet apertures 436 and 436'.

The throttle mechanism 150 has been modified by the omission of the needle valve assembly and cooperating passages as pointed out in connection with the disclosure of the construction shown in Fig. 23.

Air is introduced into the power unit through the annulus 318 formed by the tubings 2 and 3 in the well bore, through the passages 410 and ports 412 into annulus 471. A portion of the air flows through ports 426, annulus 420 and into the annulus formed by the lower strings of tubings 2 and 3 in the well bore to supply other power units, in communication therewith, with air or to do other useful work. The remaining portion of the air flows over the throttle mechanism 150, over port 438 in the venturi, and over jet apertures 436 and into the combustion chamber 430 in the manner previously described.

As above indicated, jet apertures 436 provide means of conveying fuel to the air in the combustion chamber 430 in quantities to form an inflammable mixture therewith. This mixture is then ignited by electrical energy supplied through the cable 5 to the igniters or electrodes 431; continued combustion will, in most cases, be self-sustaining and hence continuous supply of electrical energy to the igniters 431 need not be maintained.

Products of combustion, formed as a result of the ignition of the inflammable mixture, move by their expansion within the combustion chamber 430, through flame arrestor 448, velocity tube 439 and through port 440, unseating valve 441 lightly held therein by the spring 446.

The function of the valve 441 is to provide temporary closure of port 440 where pressures of fluids, including well fluids in the mixing chamber 403 exceed pressures of fluids including those of the products of combustion in the velocity tube 439 and hence in combustion chamber 430.

Mixing chamber 403 is in constant communication with the interior of the tubing 3 and hence with atmospheric pressure, as described in Fig. 2. Thus, well fluids moving through the lower section of tubing 3 enter the mixing chamber 403 by way of ports 454, annulus 444, and ports 443.

The commingling of well fluids and the products of combustion occurs in the chamber 403 and tubing 3 in communication therewith. Aeration, expansion, and heat transfers between the bodies of fluid in expanding to atmospheric pressure moves the fluids as by flow from a high pressure area to an area of lower pressure. Hence, the fluids move through tubing 3 and to surface means, as described in Fig. 2.

A form of power unit is shown in Figs. 28 to 32 inclusive, and such form is of particular utility with that shown in Figs. 33 to 38 inclusive.

These power units are of particular importance either singly or in cooperation where the depth of the well bore and the character of well fluids upon which work is performed by the power units permit utilization of the annulus formed by the well casing and tubing 2, as illustrated for example in Fig. 3 such annulus being utilized as a fuel and air chamber. Resistance to air flow in a small tubing or in a small annulus, due to inherent friction and where utilization of air is an appreciable factor, prompts consideration of the annulus above described for this purpose. Thus, this form of the invention effects a savings in the amount of work required to press air into the power units under some operating conditions, such as exist in deep wells, where considerable resistance to air flow is offered by conductors therein. This is an important factor in the operation of the power units.

It is desirable also to effect utmost utilization of available energy derived from the power units secured in the well bore. Hence, a single, tapered string of tubing, secured therein affords a means of utilizing pressure gradients in both the tubing and adjacent annulus formed by the tubing and the well casing, to the utmost advantage in the method described, particularly in deep wells where a number of power units are employed therein.

It will be observed in the foregoing illustrations that the power unit 41 illustrated in Figs. 33 to 38 inclusive, is adaptable for requirements of a booster power unit, in a series of the power units secured in the well bore, whereas the power unit 42 illustrated in Figs. 28 to 32 inclusive is peculiarly adapted to meet requirements of a bottom hole power unit.

The construction of the power units and the fluid flows therethrough can be described as follows:

In operation of these power units, air and fuel are introduced into the annulus formed by the well casing and the tubing 2. A "dead oil," fuel oil, and some well fluids are preferable to fuels easily volatilized; and air and fuel move thereinto as illustrated in Fig. 3, flowing downwardly in the well bore due to pump or compressor force and/or gravity flow.

Tubing 2, positioned in the well bore as illustrated in Fig. 3, is in communication with the successively lower power units 41 and 42 referred to above. Tubing 8, (Fig. 30) which as packer 599 thereabout, is in communication with well fluids in the well bore and is secured to the power unit 42.

The packer 599 precludes the flow of well fluids from the lower extremity of the well bore into the annulus formed by well casing 1 and the tubing 2, and which carries the power units secured in the string of tubing, as described above. Thus, the power units form an integral part of the string of tubing 2, and communication therewith by well fluids from the lower extremity of the well bore is by means of the tubing 8, and the tubing 2.

The air and fuel above described, flow downwardly in the well bore to diaphragm 501 and enter the annulus formed by tubing 2 and conical body 502, thence into the annulus 503 formed by separator casing 504 and pup joint tubing 505, secured to tubing 2. Tubing 505 is also secured to the base 506.

Cone body 502 is constructed to form a partial support for the diaphragm 501 and is secured thereto.

Diaphragm 501 is constructed of a pliable material, the periphery of which tends to adhere to the well casing 1 due to its elasticity and the difference in air pressures on opposite sides of the diaphragm 501. Air pressure on the upper side of the diaphragm exceeds the pressure on the lower side of the diaphragm when the power units are in operation due to friction resistance afforded the passage of air and due to the flow of air into the power units.

The separator base 506 carries the fuel screen 507 to exclude extraneous materials from fuel flowing therethrough as by gravity flow, and affords also comparative resistance to the air flow from the annulus 503 to the annulus 508, formed in the base 506. The resistance to flow therethrough afforded by fuel screen 507, and the restricted area of the ports 513 formed in base 506, is such that where a large quantity of fuel enters the annulus 503 a considerable portion thereof will be deposited on the upper surface of fuel screen 507 thus further increasing the resistance to air flow therethrough. Accumulation of fuel therethrough due to comparative small resistance afforded the air in the passage through the apertures 509 formed in cone 502, apertures 509', formed in baffle cone 510, and apertures 509'', formed in casing 504, near the upper extremity thereof, through which the air flows as by forces previously described and due to comparative differences in density of the air and fuel.

The lower extremity of the casing 504 is secure to a spider 585, and the lower extremity of this spider is secured in the base 506.

The conical body 502 contains the spider 511 which precludes lateral motion relative to the tubing 2.

Baffle cone 510 is concentrically secured around conical body 502 by spider 512 attached to cone 502 and cone 510. Cone 510 is secured to casing 504 at the upper extremity thereof, and is thereby concentrically mounted within casing 504.

Ports 513, formed in base 506, afford communication between annulus 508 and chamber 514 formed in the base 506. Thus fuel flows due to its hydrostatic head into chamber 514 from chamber 508.

The tubing 2' interconnects the base 506 and the upper extremity of the cylindrical body 535, which carries therein the spider 524.

The tubing 2' also contains tubing 523 concentrically placed therein, and the annular space thereinbetween forms the chamber 543. The upper extremity of tubing 523 is secured to the tubing sleeve 522 to form with elements thereabove a continuous passage upwardly to the interior of the tubing 2.

The lower extremity of tubing 523 is secured to a pressure connector 547 which in turn is employed to effect a pressure seal with the conical recess in spider 524 into which pressure connector 547 slidably fits. Hence, fuel flows as by gravity from the chamber 514 to the chamber 540, formed in spider 524 and thence downwardly through the chamber 543, in communication therewith.

The passage 527 provides means of communication between the fuel metering valve 26 from the chamber 540 and the jet annulus 528 formed in tubing carrier 525. Annulus 528 communicates with fuel-air chamber 553 as by means of apertures 530, in jet bodies 529. Hence, fuel flows from the chamber 540 into the fuel-air chamber 553 and also through metering valve 526 and passage 527.

In Fig. 29, a portion of the fuel also flows as by gravity into the annulus 528' through passage 527' in communication therewith, which in turn communicates with passage 527 and with fuel metering valve 526. Annulus 528' is formed in the jet carrier 556 and communicates with the combustion chamber 554 through apertures 530' in the jet bodies 529' formed therein. A portion of the fuel can flow from the annulus 528' into the combustion chamber 554 by way of fuel passage 527'.

Referring to each of said power units under discussion, a portion of the fuel in chamber 540 flows as by gravity through tubings 538 and the annulus formed by tubing 2 and well casing 1. The hydrostatic head of fuel compresses valve spring 536 which normally retains the ball valve 533 in seat 534. This permits the exit of the portion of fuel from the power unit to the annulus described and spring 536 maintains the desired hydrostatic head of fuel in the power units. Thus port 539 is essentially a pressure relief port for the fuel.

Air from the annulus formed by well casing 1 and tubing 2, enters the power units by forces previously described, through ports 550 formed in the tubing carrier 525.

It moves thence over throttle mechanism 150 through orifice 552, formed in tubing carrier 525, and over pressure port 558 formed therein.

Pressure tube 559 outwardly of tubing carrier 525 is secured thereto and communicates with fuel metering valve 526. The air moves thence into fuel-air chamber 553 and receives therein fuel in sufficient quantities, as previously described, to form an inflammable mixture. This inflammable mixture is ignited at electrodes 557 in the combustion chamber 554.

The fuel-air chamber 553 and combustion chamber 554 are formed in the interior of the tubing carrier 525 and communicate one with the other, with the annulus formed by well casing 1 and tubing 2, by means of venturi 552. They also communicate with the velocity tube 555 which is secured concentrically within power unit casing 561 thus forming the passage 576 therebetween.

The casing 561 is secured to tubing carrier 525 in a suitable manner, and to the cylindrical body 535 in Fig. 34, and to the tubing 8 in Fig. 30.

The products of combustion formed on ignition of the inflammable mixture move from the combustion chamber 554, by forces resulting and derived from the combustion of the mixture, through velocity tube 555 and velocity tube assembly 466 further described in connection with Fig. 43 or velocity tube assembly 201 as illustrated in Figs. 9 and 10 into the passage 576, commingling therein with the well fluids which moved thereinto through tubing 8.

Passage 576 communicates with chamber 574 by means of passage 577 formed in spider 524. The chamber 574 is formed in spider 524 by means of the pressure connector 547, previously described. Passages 515, formed in the tubing carrier 525, cooperate to complete means of communication for the flow of well fluids through the power units.

The passage 574 within the cylindrical body 535 comprises the lower end of the continuous passage upwardly to and through the tubing 2 whereby mixed fluids moving upwardly from the combustion chamber are conducted from the well in accordance with the objectives of the invention.

The apparatus illustrated in Figs. 39 to 41 inclusive is a form of construction of the power unit in which air is supplied to the combustion chamber through the tubing 2. Reference is again made to Fig. 3 in which this power unit is shown at 52. It is here noted that this form of power unit is of particular importance where the mechanical condition of the well, the character of well fluid on which work is performed, and the fluid level of well fluids in the well bore, are such that one string of tubing therein will achieve objectives of the invention in the most practical and economical manner. The apparatus referred to above is particularly desirable as a "booster" unit in a series of power units secured in the well bore as by means of one string of tubing therein. The flow of well fluids is in the annulus formed by tubing 2 and well casing.

Fuel is provided the power unit as by means of a fuel-air separator apparatus described in detail in Fig. 46.

Figure 24:
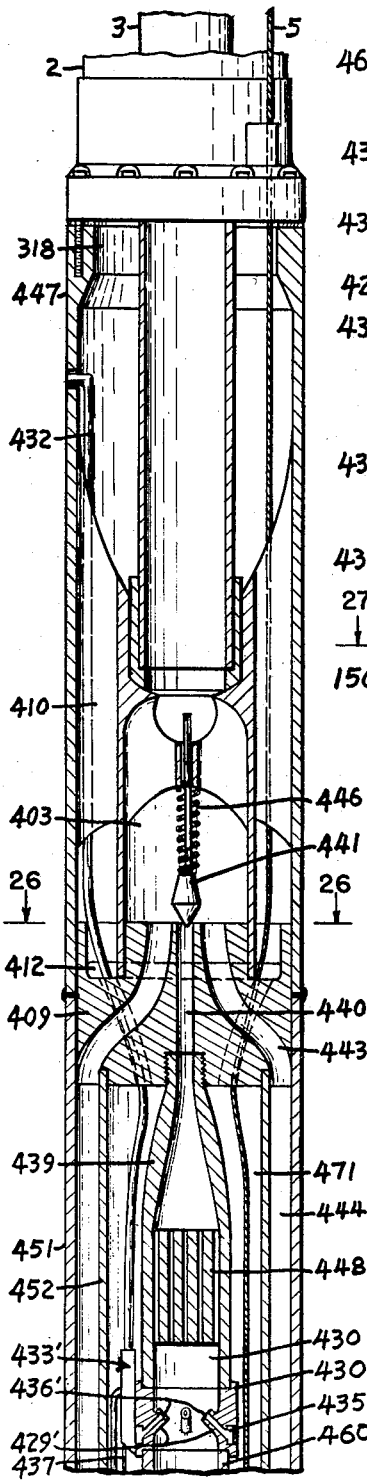
Figs. 24 and 25 are successive, vertical sectional views of an alternate form of the apparatus utilizing two concentric strings of tubing.
Figure 25:
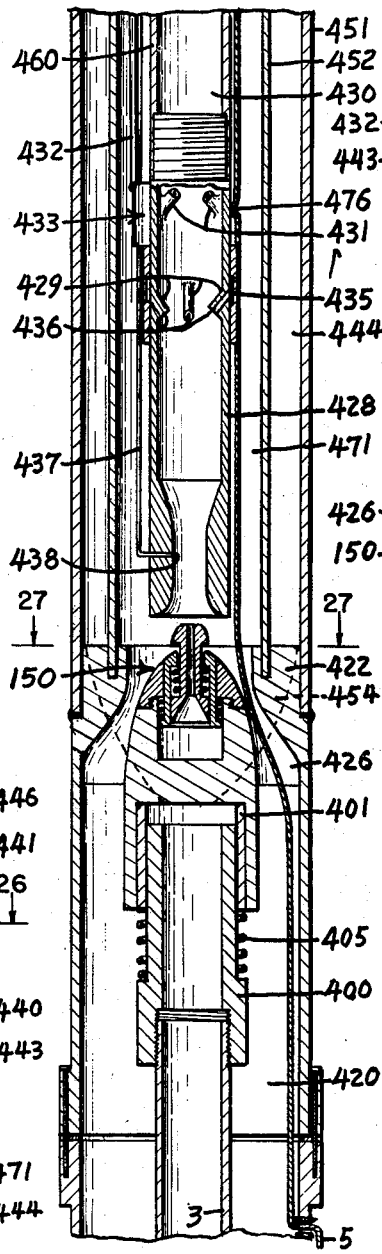
Figure 26:
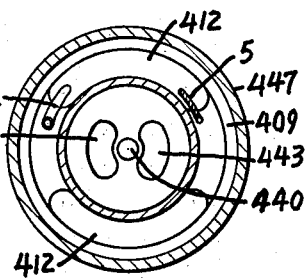
Fig. 26 is a sectional view across the mixing chamber on the line 26—26 of Fig. 24.
Figure 27:
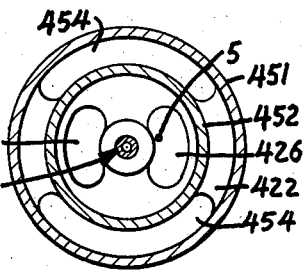
Fig. 27 is a sectional view across the lower tubing carrier on the line 27—27 of Fig. 25.

Similarity of construction with apparatus illustrated in Figs. 24 and 25, and distinctions therefrom will appear from the following description.

An upper section of the tubing 2 is secured to flange 562 and the flange 562 is in turn secured to tubing carrier 549. Fuel tubing 472 from the top of the well and the ignition cable 5 pass in a suitable manner from the exterior to the interior of the flange 562 and thence extend downwardly within the well bore.

Tubing carrier 549 is secured at its opposite ends to the cylindrical tube 569 and the flange 562 respectively.

Power unit casing 451 forms a continuation of the cylindrical tube 569, and is secured at its lower end to swage nipple 618. Where several of these power units are secured in the well bore, the lower extremity of fuel tubing 472', which communicates with fuel tubing 472 and the ignition cable 5', pass outwardly from within the swage nipple 618 to communicate with power units therebelow in the well bore. However, where only one power unit is secured in the well bore, each the fuel tubing and the ignition cable may terminate above this point.

Similarly, the lower extremity of the tubing 2 is plugged below the power unit, where the unit illustrated is the only unit in the well, or the lowest of a series of units secured in the well bore. In other words, the tubing 2 is plugged on below the lowermost power unit.

The mixing chamber housing 409 is secured within the casing formed by the tubular members 451 and 569. Separator tube 452 is concentrically secured within the power unit casing 451 to the lower extremity of the mixing chamber housing 409.

The velocity tube 439 carries flame arrestor 448 formed as an integral part thereof, and is concentrically secured within the separator tube 452 at the lower extremity of the mixing chamber housing 409. The flame arrestor 448 contains longitudinal passages therethrough providing means of communication between the velocity tube 439 and the port 440 formed in the housing 409.

Jet carrier 430', bearing jets 429' with apertures 436' formed therein in communication with annulus 435', formed therein, and combustion chamber 430, is secured as by means of a weld to the velocity tube 439.

The jet carrier 430' is secured to cylindrical tube 460 as by means of a weld, and the cylindrical tube 460 is secured as by threads to cylindrical Venturi tube 428'.

Tube 428' carries Venturi body 428 formed therein at its lower extremity. Venturi body 428 bears port 438 communicating with fuel metering valves 433 and 433' by means of pressure tube 437. This pressure tube 437 is secured to venturi 428', and to the fuel metering valves 433' and valve 433.

The tube 428' bears jet bodies 529, with apertures 530 which communicate with the annulus 528, combustion chamber 430, and the fuel metering valve 433. This was fully explained above when referring to Fig. 13.

Fuel tubing 472 communicates with a suitable source of fuel such as a fuel-air separator, as shown in Figs. 3 and 46. The fuel tubing 472 is also secured to the fuel metering valves 433' and 433, and to the fuel tubing 472'. The fuel metering valve 433' in turn communicates with annulus 435'.

Fluid separator block 519 forms a barrier in the annulus 444 below ports 520 in the power unit casing and above the ports 518 formed in the separator tube 452. The separator tube 452 carries the conical body 416 secured thereto as by means of a weld, on its lower extremity.

Body 416 carries throttle mechanism 150 secured thereto as by threads. The tubing 418, secured to the body 416, communicates with tubing 472, and also communicates with the throttle mechanism 150 by means of passage 417' in the body 416.

Passages 565 in the tubing carrier 549 extend outwardly from the mixing chamber 503 and communicates with the annulus formed by the well casing 1 and the tubing 2.

Spider 402 is secured to the inner walls of the tubing carrier and carries at its hub the valve 441 slidably therethrough. The spring 446 surrounds the valve stem and is held in compression by the head of the valve and the shoulder formed by the lower extremity of the hub in the spider 402. The arms of the spider 402 are of a spiralling configuration, as illustrated, to provide a swirling motion in fluids flowing thereover.

The combustion chamber 430 communicates at its upper and lower ends with the velocity tube 439 and the Venturi body 428 respectively, there being ports 518 in the separator tube forming a passage between the venturi and the annulus 471. The ports 412 formed in mixing chamber housing 409 in turn provide communication between the annulus 471 and the chamber within the tubing carrier 549.

In operation of the construction just described, fuel flows downwardly through the tubing 472. A portion of the fuel flows as by gravity flow and due to the difference in density of the fuel with that of the air, as normally a "dead" oil of suitable character is employed as the fuel with the fuel-air separator described in Fig. 46, through the fuel metering valve 433' thence into combustion chamber 430, in communication therewith. A portion of the fuel also flows from fuel tubing 472, through the metering valve 433 thence into the combustion chamber 430.

Additional fuel to combine all free oxygen in the portion of the air in the combustion chamber 430, is provided by apertures 436' in fuel jets 429'. The products of combustion flows thence through the velocity tube 439 and through the valve 441 to unite with and impel upward movement of well fluids moving upwardly through the ports 443.

As the annulus formed by the well casing 1 and the tubing 2 is at a reduced pressure, atmospheric pressure in some instances, the fluids due to their aeration and forces exerted by the products of combustion thereon, move thence from the well bore through means previously described in Fig. 3.

The apparatus illustrated in Figs. 42 and 43 just described, is of particular importance where the character of the well fluid on which work is performed, and the fluid level of well fluids in the well bore are such that one string of tubing therein will achieve objectives of the invention in the most economical and practical manner. This aperture is particularly desirable for work at or near the bottom of the well bore, and is suitable for use in conjunction with the apparatus illustrated in Figs. 39 and 40.

The packer 599, illustrated as secured to the apparatus, can be omitted in some installations and water, or other suitable fluid, may be flowed into the well bore to effect a dissolution of minerals or fluids in a formation and be subsequently ejected from the well bore by means of the operation of the apparatus.

The structure shown in Figs. 42 and 43 will be apparent from a description of the operation thereof, it being understood that parts heretofore described have like reference characters.

Air enters the apparatus through the tubing 2 and flows into the chamber 517 whence it moves downwardly into the annulus 614. A portion of the air passes through the air ports 490 and into combustion chamber 554.

Another portion of the air moves over the throttle mechanism 150 and thence through the venturi 428, mixing with fuel supplied through the jets 429, to form an inflammable mixture therewith. The resulting mixture thus formed is subjected to continuous combustion in the manner previously described.

Fuel is provided from a suitable source, such as a fuel-air separator or as by a tubing to the surface, and moves through the fuel conductor tubing 472 to the fuel metering valve 433 and thence through the tubing 434 and the jets 429 whereby it is sprayed into the air in the combustion chamber 554.

Because of its novel construction, special attention is directed to the velocity tube assembly 466 and its functioning in connection with the structure thereabove.

Due to forces resulting from combustion within the chamber 554, the products of combustion move downwardly through the velocity tube 555, and unseat the cone valve 570, resting in the lower extremity thereof by compression of spring 572 resting upon the hub of spider 573. This also unseats the reversing cone 571 so that the gases pass into the mixing chamber 574.

Downward movement of the push rod 612 on the cone valve 570 causes the ball 604 to be engaged thereby to unseat the ball from the seat ring 605. This permits well fluids to flow controllably upwardly to commingle with the gases of combustion within the chamber 574.

The mixing of well fluids entering the chamber 574 with the products of combustion emitted by the velocity tube 555, occurs in the mixing chamber 574 and in the interior of the swirling cylinder 551, as the fluids are displaced in the mixing chamber 574 by the action of the products of combustion. These mixed fluids thence move upwardly around the velocity tube 555 and through ports 565, into the annulus formed by the tubing 2 of the casing 1. Hence the fluids flow to surface means in communication therewith.

The velocity tube 555 is provided with fluid injector valves 456 best shown in Figs. 44 and 45. It is intended that these valves shall permit the introduction of well fluids into the combustion chamber 554 and it is to be understood that they can be spaced as desired in the velocity tube, depending on character of fluids moved. A typical fluid injector valve is shown in Figs. 44 and 45 as comprising a flexible plate 627 secured in a recess in the velocity tube. This plate has openings 630 and carries an axial plunger 632 which slidably fits within an opening in the retainer 631 as this plunger moves axially from differential pressure between the exterior and the interior of the velocity tube.

The air ports 490 in the velocity tube 555, permit the introduction of unthrottled air thereinto as a function of the air pressure in the annulus 614. The velocity tube 555 is secured to the tubing carrier 549 below the air ports 490 in a manner to effect a seal between the ports 565 and the annulus 614.

The valve 450, is of particular importance where communication is desired between fluids on two surfaces formed by the same body as a function of velocity flow over one of the surfaces, as for example illustrated in Figs. 42 and 43. The action consummated is the product of the relationship in resultant forces acting on the said surfaces.

Obviously, a fluid separator tube such as that illustrated in Figs. 19 and 20 can be secured to the tubing carrier 549, permitting air in the annulus 614 to supply other power units in series therewith, depending on air flow requirements for the power units secured in the well bore.

The apparatus illustrated in Fig. 46, referred to as a fuel-air separator, can be employed with the apparatus illustrated in Figs. 39 and 40, and has previously been given the character reference 51.

This apparatus provides means for the segregation of fuel and air flowing through the tubing 2, and further affords a fuel reservoir and means to permit fuel supply to the power unit or units secured in the well bore in communication therewith.

The fuel employed is of such character that the density of same exceeds that of the air. Hence, the fuel can be effectively separated from the air in the fuel-air separator in a manner now described. Flow of fluids through the tubing 2 enters the conductor 633 which forms a section in the tubing.

The separator casing 634 is secured at its ends to the conductor 633. This forms a chamber 638 within which the conical spiral flight surrounds the conductor 633 and has a spiral skirt 635 attached thereto and extending downwardly to screen body 642 spaced above the lower end of the chamber.

A plate 641 extends transversely of the conductor 633 below the port 635 therein so that fuel and air moving downwardly are required to move radially through this opening and thence spirally whereby the heavier particles of fluid comprising fuel, are deposited on the interior surfaces of the spiral elements 635 and 636 as a result of the centrifugal action of the fluids flowing over these elements and the expansion of the fluids. These heavier particles of fluid flow as by gravity to the base of chamber 638 through the screen 642. The function of the screen body 642, in addition to excluding extraneous materials from fluid employed as a fuel by the power unit, affords resistance to air flow by retaining an accumulation of fuel thereon as by adhering thereto.

It is desirable that the screen body 642 remain submerged in the fuel. Fuel flow in to the apparatus is regulated by surface means to preclude the fuel level from exceeding the level of the port 640 therein, or other suitable means.

Air flows from the chamber 638 through the port 640 and thence into the tubing 2 in communication with the power unit.

The fuel flows as by means of gravity through fuel tubing 639, to a tubing communicating with the power unit so that a proper fuel air mixture is provided in a manner previously described.

The embodiment of the invention shown in Figs. 48 and 50 inclusive comprises means in which the well fluids and the products of combustion remain separated other than through the exchange of heat energy in the well bore.

This apparatus is of primary importance where it is desired to preclude commingling of the well fluids with the products of combustion in the well bore. In this construction air is introduced into the annulus formed by the well casing and the tubing 2. A suitable combustible is introduced into the tubing 432; the products of combustion formed from admixing of the air and fuel and burning thereof is emitted into the annulus formed by the tubings 2 and 3 and the well fluids are ejected from the well bore by way of the passage in the tubing 3. The tubing 2 may carry a suitable packer, secured thereto as by threads, to form a seal with the casing 1 to preclude commingling of air and the well formation fluids in the well bore at a level therein below the power units secured in the well bore.

The annulus formed by the tubings 2 and 3 in effect, comprises the combustion chamber 430 in the well bore. The tubing 2 has the ports 518 formed therein adjacent to the throttle mechanism 673, which cooperates with the Venturi body 428' to further regulate the flow of air into the combustion chamber. The Venturi body 428' has the port 438 formed therein at its apex.

A throttle mechanism 673 is mounted in the power unit adjacent its lower end and the structure and operation of this mechanism will be made apparent from further description of the operation of the device and reference to similar structures in embodiments heretofore described.

Within the tubing 2 and above the combustion chamber 430 are successively a boiler assembly and a control valve assembly to which the tubing 3 is connected at opposite ends. The boiler shell 643 forms a chamber 622 through which extend velocity tubes 648, it being intended that the gases of combustion from the chamber 430 shall pass upwardly through these tubes and about the shell 643. These gases liberate energy in the form of heat to the walls of the chamber 622 and to the velocity tubes 648 and thence move upwardly through the annulus formed between the tubes 2 and 3.

The lower section of tubing 3 communicates with the formation fluids in the well bore. Hence, well fluids can enter the apparatus by means of the tubing 3, due to the hydrostatic head of the formation fluids or as by the resulting action of the power units in communication therewith. The fluids thus enter the apparatus through the tubing 3 and a suitable check valve 619 which precludes flow of fluids through the tubing 3 downwardly in the well bore, but permits flow of fluids to the surface and means in communication therewith.

Hence, well fluids flow through the chamber 622 and into the cylindrical tube 644 having piston 645 therein. At predetermined pressures on its lower face, the piston 645 moves upwardly and compresses the spring 649.

As best seen in Fig. 51, the hollow piston rod 650 contains valve ball 670 normally held upon its seat therein by spring 671. Ports 677 formed in the hollow piston rod 650 provides communication from below the piston 645 to the chamber

663 beneath orificed piston 663 and the chamber 668 (Fig. 48).

Ports 656 are formed in the valve carrier 654 in such a manner to form a seat for the valve balls 658 and are further of such configuration that the spring 660 in compression with the ball race 661 tends to thrust the valve balls 658 in contact therewith into valve seats formed in the ports 656 irrespective of lateral rotation of the ball race 661. A further function of the ball race 661 is to space the valve balls 658 in cooperation with the configuration 657, formed on the upper face of the piston 645, when in place in the chamber 659.

On pressures of formation fluids occasioned by the heating thereof in the chamber 622, and formation and hydrostatic pressures thereon, the piston 645 of the valve assembly is urged upwardly due to the difference in the pressures with that in the tubing 3 which can communicate with atmospheric pressure. Hence, the spring 649 is retained in compression as the piston 645 moves upwardly in the tube 644. As the pressure on the lower face of the piston 645 is increased, as by addition of heat energy to the fluids in the chamber 622, the upper face of the piston 645 unseats the valve balls 658 and thus tends to compress the spring 660 thereby.

The piston 663 also moves upwardly and the chamber 668 therebeneath tends to fill with formation fluids flowing upwardly through the rod 650.

The ports 669 in the piston 663 bleed the fluids from the chamber 668 into the chamber 664, and the port 655 at the upper end thereof permits the fluids to flow into the chamber 662 and the tubing 3.

On exertion of additional pressure on the lower face of the piston 645, the piston is thrust upwardly into the chamber 659 dislodging the valve balls 658 in the upward movement thereof, thus permitting communication between the chamber 662 and the tube 644 to be effected by means of the ports 656.

Hence, the piston 645, the valve balls 658 and the ball race 661, are retained in the chamber 659 due to pressure flow of the fluids through the ports 656. This flow of fluids is occasioned by the fluids moving from an area of higher pressure and temperature to that of an area of lower pressure and temperature. Springs 660 and 649 are retained in compression at this point in the operation of the device as the fluid pressure in the chamber 668 exceeds the fluid pressure in the chamber 664 due to a relatively slow equalization of pressures through the ports 669. The fluid pressure in the chamber 668 cooperates with the fluids pressure at the ports 656, thus tending to retain the piston 645 in the chamber 659.

As the fluid pressure at the ports 656 decrease due to an equalization of pressures therein with the fluid pressures in the tubing 3, and as the fluid pressure in the chamber 668 tends to equalize with the fluid pressure in the chamber 664 in communication therewith, through the ports 669, the spring 649 and the spring 660 cooperate to thrust the piston 645 downwardly into the tube 644, and thrust the valve balls 658 into respective seats formed by the ports 656, thereby closing the ports.

The action described above permits sudden opening of the ports 656, which results in a partial evacuation of the chamber 622, by surge of the fluids therefrom, into the tubing 3 on release of the pressure on the chamber 622. The tube 670 in the chamber 622 cooperates in the described action in providing a high velocity means through which the fluids flow through the chamber 622. Hence, the well fluids flow through the tubing 3 to surface means in communication therewith, the piston 645 functioning to regulate flow of fluids from the chamber 622 into the chamber 662. On partial evacuation of the chamber 622, a fresh charge of fluids enter the lower portion thereof through the check valve 619, the action described being repeated at intervals, contingent on pressures in the chamber 622, the calibration of the springs 649 and 660, the character of fluids in the chamber 622 and the heat energy available in the combustion chamber 430, to flow the well.

The apparatus illustrated in Figs. 54, 55, and 56 has been previously referred to as power unit 25 in Fig. 2. It is the intent of the form here shown to illustrate means wherein the power unit is in effect a continuation of the tubing 2 and the tubing 3, in the well bore. Previous description in connection with the Fig. 2, as regards air and fuel flows, is applicable.

Fuel of a suitable combustible character is introduced into the annulus formed by the well casing and the tubing 2, and moves to the fuel metering valve 703, as described in Figs. 14 and 15, in communication with the annulus by the connections 296 and 294.

The fuel tubing connection 295 conducts fuel from the fuel metering valves 703' and 703 to the combustion chamber 691 by way of the annulus 528 therewith and the apertures 436 formed in the jet bodies 429. These apertures 436 communicate directly with the combustion chamber 691.

A part of the fuel also flows through the tubing 705, passage 707, chamber 711' and thence through passages 711 into the combustion chamber 691. The fuel flowing through the apertures 436 forms a counterflow to the fuel flowing through the passages 711 and the air stream entering the combustion chamber 691 and cooperates with the configuration 712, formed in the jet carrier body 675 to provide a swirling motion in the flows, and hence a uniform mixing of the fuel with the air.

The air is introduced into the well bore through the annulus formed by the tubing 2 and the tubing 3, and flows thence through the passage 718 into the power unit. A part of the air moves over the throttle mechanism 704, and the body 717 containing the port 438 therein, and thence into the combustion chamber 691, mixing with the fuel flowing thereinto to form therewith the inflammable mixture.

A part of the air supplied also moves through the passage 718' to the bottom hole valve 50, or to other power units in communication therewith, to do useful work in the well bore.

The combustion chamber 691 is provided with the sleeve valve body 690 slidable thereabout and constructed to form a seal with the surrounding tube 452. The valve sleeve body is constantly urged downwardly by a compression spring 701 and in this manner the inclined passages in the venturi 696 are normally closed at their outer ends whereby the flow of fluids from the tubing 3' to the combustion chamber 691 is precluded.

Well fluids enter the power unit through the tube 8, the bottom hole valve 50, Fig. 2, the tubing 3, and the tubing 3' and are aerated and ejected from the apparatus or power unit by the products of combustion and forces derived therefrom. These forces thrust the valve body 690 upwardly into the velocity chamber 778, and permit flow of the products of combustion through the ports 695 and 697 and permit communication to be established with a reduced pressure in the tubing thereabove.

In operation, the throttle mechanism 704 regulates the flow of air into the combustion chamber 691, through the annulus formed by the body 777 and the tubing 3', as the throttle valve body 709 tends to move into a low pressure area formed therein on high rates of air flow therethrough. This action is automatic and serves to proportion the air into the power unit under stipulated operating conditions.

Figs. 58, 59 and 60 illustrate an apparatus which may be employed in conjunction with the power units to convey electrical power for ignition purposes thereto.

The employment of the apparatus obviates permanent installation of the ignition cable 5 from the surface to the uppermost power unit in the well bore inasmuch as it is removable and may be inserted or removed as by means of a wire line secured thereto.

It is to be noted that the lower portion of Fig. 60, illustrating the contacts in the power unit, is readily adaptable to a power unit of the type illustrated in Fig. 19 and Fig. 20 for example.

The cylindrical tube 720 is secured to the body 721 therein, and also to the cylindrical tube 720'. The tube 720 contains the removable batteries 722 therein, which rest on the body 721 therein to effect an electrical contact therewith. The battery cap 723 bears the electrical contactor body 724 to which is attached the insulated conductor 725.

The cap body 726 bearing the wire line passage 727 formed therethrough can be secured to a suitable wire line in the obvious manner. The tube 720 secured to body 726 and the body 721 form a chamber for the batteries 722 as just described.

The tube 720' extending downwardly from the body 721 contains the spring 728 slidably fitted therein and exerting a downward force upon the piston 729 sealably slidable upon the rod 730 having axial passage 736 through which conductors 737 pass to the contactor assembly 748 at the lower end of the device. It is intended that the entire device may be lowered into a seat provided in a power unit body 758 (Fig. 60) and that such seating will close an electric circuit to effect ignition and continuous combustion within a power unit, such as any of those above described.

The contact mechanism 748 comprises a contact sleeve 742 which is slidably fitted into the tube 720' at the lower extremity thereof carries an external shoulder thereon forming a seal for the spring 743. The upper extremity of this spring bears on the base of a spider body 732 and the contact sleeve 742 is retained in the tube 720' by means of an internal shoulder formed therein.

Within the contact sleeve 742 are successively an insulator sleeve 733, a contactor sleeve 744, an inner insulator sleeve 745 and a plunger body 746 slidably interfitting and having their relative terminal positions determined by cooperating shoulders on successively smaller members.

The sleeve 744 is urged downwardly by compression spring 750 engaging the insulator ring 749 at the upper end of the sleeve 745. This also maintains compression in spring 747 whereby the plunger body 746 is held in a lowermost position.

One of the conductors 737 is electrically connected to the plunger body 746 so that an electric circuit may be completed therethrough as now described.

Preliminary to lowering the device in a well the chamber 740 is filled with a suitable fluid such as a transformer oil, the piston 729 being forced upwardly against the spring 728 during such filling whereby this fluid is under pressure.

When the device is lowered to a position proximate that shown in Fig. 60, the sleeve 742 engages a seat in the body 758. Further lowering of the device causes the lower ends of elements 744, 745, and 746 to engage complementary surfaces on the body 758. When the ports 755 and 756 in the elements 742 and 732 become aligned during such lowering, fluid moves downwardly from the chamber 740 through passage 754, port 756 and thence downwardly to the chamber 760 and out through passages 759 in the body 758. Fluid also moves from the chamber 740 below the piston 729 through port 739 and the bore 736 in the rod 730. This flow of fluid, previously filling chamber 740, thus serves to effectively flush the chamber 760 whereby desired electrical conditions are obtained. Hence, by successive vertical movements of the device, ignition is effected from current supplied through the cable 5' to the power unit of which the body 758 forms a part. The electrical circuit is shown schematically in Fig. 61, and it is understood that the transformer 771 and the condenser 772 are suitably contained in the housing 770.

The invention claimed is:

1. The method of inducing the flow of air into one or more combustion chambers located in a well bore comprising, igniting a fuel air mixture in said combustion chambers, expanding the products of combustion in a conductor within the well bore, and utilizing the velocity flow of the products of combustion to induce a flow of air into said combustion chambers.

2. The method of moving fluids with the energy of a heated gas comprising, igniting a combustible fuel air mixture introduced continuously into a chamber submerged in a fluid, ejecting the resulting gases from said chamber by their expansion through a conduit having communication with said fluids, and expanding the resulting mixture through a conduit to propel the fluids therethrough.

3. The method of propelling fluids comprising, establishing and maintaining continuous combustion of a fuel air mixture in one or more chambers having direct communication with a fluid, expanding the resultant mass in a common conductor to propel same, and utilizing the energy of combustion to compress air and to propel the air to said combustion chambers and to return fluids to a fluid stream for recirculation through at least one of the combustion chambers.

4. In an apparatus for moving fluids in a column in a well the combination of, a series of combustion chambers in a well bore, an air conduit in the well bore having free communication with a series of combustion chambers therein, ejection tubes in communication with said chambers means for introducing into said chambers fuel to commingle with air therein, means to ignite the resulting mixture, and means to vary the velocities through the ejection tubes and atomization of the fluid column therein.

5. The method of producing fluids from a well, comprising, generating gases of combustion within a well bore, directing the gases in a confined stream upwardly in the well, expanding the upwardly flowing stream of gases within the well bore, and employing the energy created within the well bore by such expansion to draw well fluids into intimate mixture with said stream of gases to thereby aerate said fluids and to propel the thus aerated mixture to the surface.

6. Apparatus for producing fluids from a well, comprising, a combustion chamber positioned within a well bore, means for generating gases of combustion within said chamber, ejector means communicating with a body of well fluids within the well bore, and means for discharging said gases of combustion from said chamber through said ejector means whereby to draw said fluids into said ejector means and into intimate mixture with said gases of combustion and to propel said mixture to the surface.

7. Apparatus for producing fluids from a well, comprising, in combination with a conductor pipe extending into a well bore and having a passageway communicating with a body of well fluid therein, a combustion chamber disposed in the well bore, means for generating gases of combustion within said chamber, an expander means disposed in said pipe and communicating with said passageway, and means for discharging the gases of combustion from said chamber through said expander means into said pipe.

FRED S. TUTTON.

References Cited in the file of this patent
UNITED STATES PATENTS

| Number | Name | Date |
|---|---|---|
| 693,813 | Burdon | Feb. 18, 1902 |
| 715,519 | Steese et al. | Dec. 9, 1902 |
| 1,105,747 | Bovee | Aug. 4, 1914 |
| 1,171,620 | McIntyre | Feb. 15, 1916 |
| 1,457,479 | Wolcott | June 5, 1923 |
| 1,473,348 | Howard | Nov. 6, 1923 |
| 1,758,346 | Arutunoff | May 13, 1930 |
| 2,238,701 | McCollum | Apr. 15, 1941 |
| 2,269,294 | Udale | Jan. 6, 1942 |
| 2,272,477 | Pfleger | Feb. 10, 1942 |
| 2,336,609 | Herbster | Dec. 14, 1943 |
| 2,447,482 | Arnold | Aug. 24, 1948 |
| 2,491,610 | Goddard | Dec. 20, 1949 |